(12) United States Patent
Raj

(10) Patent No.: US 8,320,542 B2
(45) Date of Patent: Nov. 27, 2012

(54) METHOD AND SYSTEM FOR TELEPHONE NUMBERS LINKING CALLERS WITH GREATER FUNCTIONALITY

(75) Inventor: Satish Raj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 977 days.

(21) Appl. No.: 12/359,482

(22) Filed: Jan. 26, 2009

(65) Prior Publication Data

US 2010/0189245 A1 Jul. 29, 2010

(51) Int. Cl.
*H04M 3/42* (2006.01)
(52) U.S. Cl. .................................. 379/201.01; 370/352
(58) Field of Classification Search ............. 379/201.01; 370/352
See application file for complete search history.

(56) References Cited

U.S. PATENT DOCUMENTS

| | | | |
|---|---|---|---|
| 4,757,267 A | 7/1988 | Riskin | |
| 5,388,147 A | 2/1995 | Grimes | |
| 6,330,324 B1* | 12/2001 | Sabinson et al. | 379/221.08 |
| 7,949,347 B1* | 5/2011 | Copeland | 455/456.1 |
| 8,060,108 B1* | 11/2011 | Rayburn et al. | 455/456.1 |
| 2005/0201544 A1* | 9/2005 | Book et al. | 379/219 |
| 2007/0021125 A1* | 1/2007 | Zhu et al. | 455/456.1 |
| 2008/0125077 A1* | 5/2008 | Velazquez et al. | 455/404.2 |
| 2009/0172131 A1* | 7/2009 | Sullivan | 709/219 |
| 2011/0211494 A1* | 9/2011 | Rhodes et al. | 370/259 |

FOREIGN PATENT DOCUMENTS

| | | |
|---|---|---|
| EP | 1001590 A2 | 5/2000 |
| WO | WO0113662 A1 | 2/2001 |

OTHER PUBLICATIONS

International Search Report and Written Opinion—PCPCT/US2010/022133—ISA/EPO—Jun. 11, 2010.

* cited by examiner

*Primary Examiner* — Quynh Nguyen
(74) *Attorney, Agent, or Firm* — James T. Hagler

(57) ABSTRACT

Methods and systems provided telephone accessible services to callers which are responsive to information about the caller obtained during the call. A telephone service point located anywhere within the telephone network receives a telephone call to particular numbers referred to as hypernumbers and provides services specified for the dialed number. The service point may request data from the caller's communication device and provide services or route the call in response to caller-specific information received from the communication device. Caller communication devices may be configured with software to communicate with the service point, including gathering requested caller information and transmitting the information to the service point. The service point may be configured to send information to the caller's communication device. The service point may be configured to send caller data to a server of the hypernumber owner and route the call to particular destinations based upon the caller data.

65 Claims, 19 Drawing Sheets

| Reg. Hypernumber | Caller Data to Request | Vendor Data to Send to Caller | Routing Instructions |
|---|---|---|---|
| 600-123-4567 | Name Location | Prerecorded greeting at memory location X | 345-976-0987 |
| 600-321-9876 | Local time Location E-Mail Address | Menu at memory location Y | 768-987-9877 |
| 600-321-9876 | None | None | 99.198.96.115 |

FIG. 13

| Reg. Brandnumber | Hypernumber | Caller Data to Request | Vendor Data to Send to Caller | Routing Instructions |
|---|---|---|---|---|
| 8464 "Vini" | 777-123-4567 | Name Location | Prerecorded greeting at X | 345-876-0987 |
| 5639 "Kofy" | 777-321-9876 | Local time Location E-Mail Address | Menu at memory location Y | 768-989-9877 |

FIG. 14

METHOD AND SYSTEM FOR TELEPHONE NUMBERS LINKING CALLERS WITH GREATER FUNCTIONALITY

FIELD OF THE INVENTION

The present invention relates generally to the field of telecommunications, and more specifically to methods and systems for providing telephone numbers connecting callers to sources of information.

BACKGROUND

Over the years the telecommunication industry has adapted to the increasing demands of a mobile society by technologically advancing in areas such as cellular networks and mobile devices. Today, calls may be placed and information may be accessed from almost any location in the World. Although, many aspects of the telecommunications have evolved to allow rapid access of information, there are other aspects that have remained undeveloped. For example, the concept of telephone numbers has remained static over the years. Dialing a telephone number still connects one party to another in a manner very much the same way it has for decades. Thus the telephone switching network has failed to keep up with advances in parallel communication systems such as the Internet.

SUMMARY

In one aspect, a method for communicating using a communication device is presented. The method may include placing a call to a number dialed into the communication device, activating a hypernumber software module within the communication device, collecting caller data and transmitting the caller data to a hypernumber service point. The method for communicating may also include receiving a notification from the hypernumber service point that the call was placed to a hypernumber. Activating the hypernumber software module may be accomplished in response to receiving the notification. The method for communicating may further include automatically recognizing that the dialed number is a hypernumber, wherein the collecting caller data is accomplished in response to recognizing that the dialed number is a hypernumber. The method for communicating may further include receiving a request for caller information from the hypernumber service point, wherein collecting caller data collects at least a portion of the requested caller information, receiving information from the hypernumber service point, receiving a notification from the hypernumber service point that the call was placed to a hypernumber, and establishing a communication session with the hypernumber service point, wherein caller data is transmitted to the hypernumber service point via the communication session. The method for communicating may further include receiving task options from the hypernumber service point, receiving a task option selection from a user of the communication device, and transmitting the task option selection to the hypernumber service point. The caller data may include at least one of location data, personal information about the owner of the communication device, electronic coupons and promotions stored in memory of the communication device and a specification of the communication device.

In another aspect, a method for communicating is presented that includes receiving a telephone call from a communication device placed to a hypernumber, sending a request for caller data to the communication device, receiving caller data from the communication device and forwarding the telephone call based upon the received caller data. The method for communicating may further include sending a query to a hypernumber database including the hypernumber, and receiving routing instructions from the hypernumber database corresponding to the hypernumber, wherein forwarding the telephone call includes forwarding the telephone call in accordance with the received routing instructions. The method for communicating may further include forwarding the received caller data to a second server, receiving routing instructions from the second server, wherein forwarding the telephone call includes forwarding the telephone call in accordance with the received routing instructions, forwarding an Internet address for a second server to the communication device in a message configured to enable the communication device to establish an Internet communication session with the second server, requesting caller location information from a cellular telephone service provider with which the communication device is communicating and receiving caller location information from the cellular telephone service provider. The method for communicating may further include sending task options to the communication device, receiving a task option selection from the communication device and forwarding the telephone call based upon the received task option selection. The received caller data may include at least one of location data, personal information about an owner of the communication device, electronic coupons and promotions stored in the communication device, and a specification of the communication device. Forwarding the telephone call may include transmitting the telephone call to a second server as a voice over Internet protocol (VOIP) call.

In another aspect, a method for communicating is presented that includes receiving caller data from a hypernumber service point, processing the received caller data and providing call routing instructions to the hypernumber service point based upon the received caller data. The method may further include sending task options to the hypernumber service point for forwarding to a communication device, receiving a task option selection from the hypernumber service point, providing call routing instructions to the hypernumber service point based upon the received task option selection, receiving a voice over Internet protocol (VOIP) call from the hypernumber service point, sending to the hypernumber service point an Internet protocol (IP) address for forwarding to a communication device, receiving a request for an Internet communication session from the communication device directed to the IP address, sending data to the communication device via the Internet communication session and displaying received caller data to an operator to which the call routing instructions will direct a call from the communication device.

In another aspect, a communication device is presented. The communication device may include a processor and a memory coupled to the processor, wherein the processor is configured place a call to a number dialed into the communication device, activate a hypernumber software module within the communication device, collect caller data, and transmit the caller data to a hypernumber service point. The processor of the communication device may be further configured to receive a notification from the hypernumber service point that the call was placed to a hypernumber, wherein activation of the hypernumber software module is accomplished in response to receiving the notification. The processor of the communication device may also be configured to recognize that the dialed number is a hypernumber, wherein collecting caller data is accomplished in response to recognizing that the dialed number is a hypernumber. The processor of the communication device may also be configured to receive a request for caller information from the hypernumber service point, wherein the step of collecting caller data collects at least a portion of the requested caller information. The processor of the communication device may further be configured to receive information from the hypernumber service point. The processor of the communication device may also be configured to receive a notification from the hypernumber service point that the call was placed to a hypernumber and establish a communication session with the hypernumber service point, wherein the caller data is transmitted to the hypernumber service point via the communication session. The processor of the communication device may also be configured to receive task options from the hypernumber service point, receive a task option selection from a user of the communication device and transmit the task option selection to the hypernumber service point. The communication device may further include a Global Positioning Satellite system receiver coupled to the processor, wherein the processor is configured such that the caller data includes at least one of location data, personal information about the owner of the communication device, electronic coupons and promotions stored in the memory of the communication device and a specification of the communication device.

In another aspect, a computer system is presented. The computer system may include a memory, a processor coupled to the server memory and a network connection coupled to the processor, wherein the processor is configured to receive a telephone call from a communication device placed to a hypernumber, send a request for caller data to the communication device, receive caller data from the communication device, and forward the telephone call based upon the received caller data. The server processor of the computer system may be configured to send a query to a hypernumber database including the hypernumber and receive routing instructions from the hypernumber database corresponding to the hypernumber, wherein forwarding the telephone call includes forwarding the telephone call in accordance with the received routing instructions. The server processor of the computer system may also be configured to forward the received caller data to a second server. The server processor of the computer system may be configured to receive routing instructions from the second server, wherein forwarding the telephone call includes forwarding the telephone call in accordance with the received routing instructions. The server processor of the computer system may also be configured to forward an Internet address for a second server to the communication device in a message configured to enable the communication device to establish an Internet communication session with the second server, request caller location information from a cellular telephone service provider with which the communication device is communicating, receive caller location information from the cellular telephone service provider, send task options to the communication device, receive a task option selection from the communication device, and forward the telephone call based upon the received task option selection. The server processor of the computer system may also be configured such that forwarding the telephone call includes transmitting the telephone call to a second server as a voice over Internet protocol (VOIP) call.

In another aspect, a server is presented. The server may include a server memory, a server processor coupled to the server memory, and a network connection coupled to the server processor, wherein the server processor is configured to receive caller data from a hypernumber service point, process the received caller data and provide call routing instructions to the hypernumber service point based upon the received caller data. The server processor may also be configured to send task options to the hypernumber service point for forwarding to a communication device, receive a task option selection from the hypernumber service point, provide call routing instructions to the hypernumber service point based upon the received task option selection, receive a voice over Internet protocol (VOIP) call from the hypernumber service point, send to the hypernumber service point an Internet protocol (IP) address for forwarding to a communication device, receive a request for an Internet communication session from the communication device directed to the IP address, send data to the communication device via the Internet communication session and display received caller data to an operator to which the call routing instructions will direct a call from the communication device.

In another aspect, a communication device is presented. The communication device may include means for placing a call to a number dialed into the communication device, means for activating a hypernumber software module within the communication device, means for collecting caller data and means for transmitting the caller data to a hypernumber service point. The communication device may further include means for receiving a notification from the hypernumber service point that the call was placed to a hypernumber, wherein means for activating the hypernumber software module comprises means for activating the hypernumber software module in response to receiving the notification. The communication device may further include means for automatically recognizing that the dialed number is a hypernumber, wherein means for collecting caller data comprises means for collecting caller data in response to recognizing that the dialed number is a hypernumber. The communication device may further include means for receiving a request for caller information from the hypernumber service point, wherein means for collecting caller data comprises means for collecting at least a portion of the requested caller information. The communication device may further include means for receiving information from the hypernumber service point. The communication device may further include means for receiving a notification from the hypernumber service point that the call was placed to a hypernumber and means for establishing a communication session with the hypernumber service point, wherein means for transmitting caller data to the hypernumber service point includes means for transmitting the caller data via the communication session. The communication device may further include means for receiving task options from the hypernumber service point, means for receiving a task option selection from a user of the communication device and means for transmitting the task option selection to the hypernumber service point. The means for collecting caller data may include means for collecting at least one of location data, personal information about an owner of the communication device, electronic coupons and promotions stored in memory of the communication device and a specification of the communication device.

In another aspect, a computer system is presented. The computer system may include means for receiving a telephone call from a communication device placed to a hypernumber, means for sending a request for caller data to the communication device, means for receiving caller data from the communication device and means for forwarding the telephone call based upon the received caller data. The computer system may further include means for querying a hypernumber database including the hypernumber and means for receiving routing instructions from the hypernumber database corresponding to the hypernumber, wherein means for forwarding the telephone call includes means for forwarding the telephone call in accordance with the received routing instructions. The computer system may further include means for forwarding the received caller data to a second server and means for receiving routing instructions from the second server, wherein means for forwarding the telephone call includes means for forwarding the telephone call in accordance with the received routing instructions. The computer system may further include means for forwarding an Internet address for a second server to the communication device in a message configured to enable the communication device to establish an Internet communication session with the second server, means for requesting caller location information from a cellular telephone service provider with which the communication device is communicating, means for receiving caller location information from the cellular telephone service provider, means for sending task options to the communication device, means for receiving a task option selection from the communication device and means for forwarding the telephone call based upon the received task option selection. The means for forwarding the telephone call may include means for transmitting the telephone call to a second server as a voice over Internet protocol (VOIP) call.

In another aspect, a server is presented. The server may include means for receiving caller data from a hypernumber service point, means for processing the received caller data and means for providing call routing instructions to the hypernumber service point based upon the received caller data. The server may further include means for sending task options to the hypernumber service point for forwarding to a communication device, means for receiving a task option selection from the hypernumber service point, means for providing call routing instructions to the hypernumber service point based upon the received task option selection, means for receiving a voice over Internet protocol (VOIP) call from the hypernumber service point, means for sending to the hypernumber service point an Internet protocol (IP) address for forwarding to a communication device, means for receiving a request for an Internet communication session from the communication device directed to the IP address, means for sending data to the communication device via the Internet communication session and means for displaying received caller data to an operator to which the call routing instructions will direct a call from the communication device.

In another aspect, a computer program product is presented. The computer program product may include a computer-readable medium including at least one instruction for placing a call to a number dialed into the communication device, at least one instruction for activating a hypernumber software module within the communication device, at least one instruction for collecting caller data, and at least one instruction for transmitting the caller data to a hypernumber service point. The computer-readable medium may further include at least one instruction for receiving a notification from the hypernumber service point that the call was placed to a hypernumber, wherein the instruction activating the hypernumber software module is accomplished in response to receiving the notification. The computer-readable medium may further include at least one instruction for automatically recognizing that the dialed number is a hypernumber, wherein the instruction collecting caller data is accomplished in response to recognizing that the dialed number is a hypernumber. The computer-readable medium may further include at least one instruction for receiving a request for caller information from the hypernumber service point, wherein the instruction collecting caller data collects at least a portion of the requested caller information. The computer-readable medium may further include at least one instruction for receiving information from the hypernumber service point, at least one instruction for receiving a notification from the hypernumber service point that the call was placed to a hypernumber, and at least one instruction for establishing a communication session with the hypernumber service point, wherein the caller data is transmitted to the hypernumber service point via the communication session. The computer-readable medium may further include at least one instruction for receiving task options from the hypernumber service point, at least one instruction for receiving a task option selection from a user of the communication device and at least one instruction for transmitting the task option selection to the hypernumber service point. The caller data may include one of at least location data, personal information about the owner of the communication device, electronic coupons and promotions stored in the memory of the communication device and a specification of the communication device.

In another aspect, a computer program product is presented. The computer program may include a computer-readable medium including at least one instruction for receiving a telephone call from a communication device placed to a hypernumber, at least one instruction for sending a request for caller data to the communication device, at least one instruction for receiving caller data from the communication device and at least one instruction for forwarding the telephone call based upon the received caller data. The computer readable medium may further include at least one instruction for sending a query to a hypernumber database including the hypernumber and at least one instruction for receiving routing instructions from the hypernumber database corresponding to the hypernumber, wherein the instruction forwarding the telephone call includes forwarding the telephone call in accordance with the received routing instructions. The computer-readable medium may further include at least one instruction for forwarding the received caller data to a second server, at least one instruction for receiving routing instructions from the second server, wherein the instruction forwarding the telephone call includes forwarding the telephone call in accordance with the received routing instructions, at least one instruction for forwarding an Internet address for a second server to the communication device in a message configured to enable the communication device to establish an Internet communication session with the second server, at least one instruction for requesting caller location information from a cellular telephone service provider with which the communication device is communicating, at least one instruction for receiving caller location information from the cellular telephone service provider, at least one instruction for sending task options to the communication device, at least one instruction for receiving a task option selection from the communication device and at least one instruction for forwarding the telephone call based upon the received task option selection. The instruction forwarding the telephone call may include transmitting the telephone call to a second server as a voice over Internet protocol (VOIP) call.

In another aspect, a computer program product is presented including a computer-readable medium that includes at least one instruction for receiving caller data from a hypernumber service point, at least one instruction for processing the received caller data; and at least one instruction for providing call routing instructions to the hypernumber service point based upon the received caller data. The computer-readable medium may also include at least one instruction for sending task options to the hypernumber service point for forwarding to a communication device, at least one instruction for receiving a task option selection from the hypernumber service point, at least one instruction for providing call routing instructions to the hypernumber service point based upon the received task option selection, at least one instruction for receiving a voice over Internet protocol (VOIP) call from the hypernumber service point, at least one instruction for sending to the hypernumber service point an Internet protocol (IP) address for forwarding to a communication device, at least one instruction for receiving a request for an Internet communication session from the communication device directed to the IP address, at least one instruction for sending data to the communication device via the Internet communication session, and at least one instruction for displaying received caller data to an operator to which the call routing instructions will direct a call from the communication device.

Additional aspects will be apparent in the foregoing description and equivalents thereof.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention. In the figures, like reference numerals refer to like parts throughout the various views unless otherwise indicated.

FIG. 13 is a data structure diagram of a data structure for storing hypernumber data according to an aspect.

FIG. 14 is a data structure diagram of a data structure for storing brandnumber data according to an aspect.

DETAILED DESCRIPTION

In this description, the terms "exemplary" is used herein to mean "serving as an example, instance, or illustration." Any implementation described herein as "exemplary" is not necessarily to be construed as preferred or advantageous over other implementations.

As used herein, the term "communication device" refers to any one or all of telephone devices, mobile devices, cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), wireless network transceiver cards for use in a personal computer, and similar personal electronic devices which include a programmable processor and memory as well as the capability to connect to a wireless network. The term may also encompass personal computers, such as a laptop computer or a desktop computer, with wired and wireless network transceiver circuits when used in the description of the various aspects which may also be implemented on or with personal computers.

Over the past decades the telecommunications industry has advanced technologically to adapt to the increasing demands of a mobile society. The advancements and adaptabilities of the telecommunications industry have provided society with an array of services, such as cellular networks and mobile devices. Today, calls may be placed and information may be accessed from almost any location in the world. However, as many technological aspects of the telecommunication system have evolved to allow rapid access to information, there are other aspects which have not advanced at the same pace and degree. For example, the concept of telephone numbers has remained static and undeveloped over the years.

Figure 1:
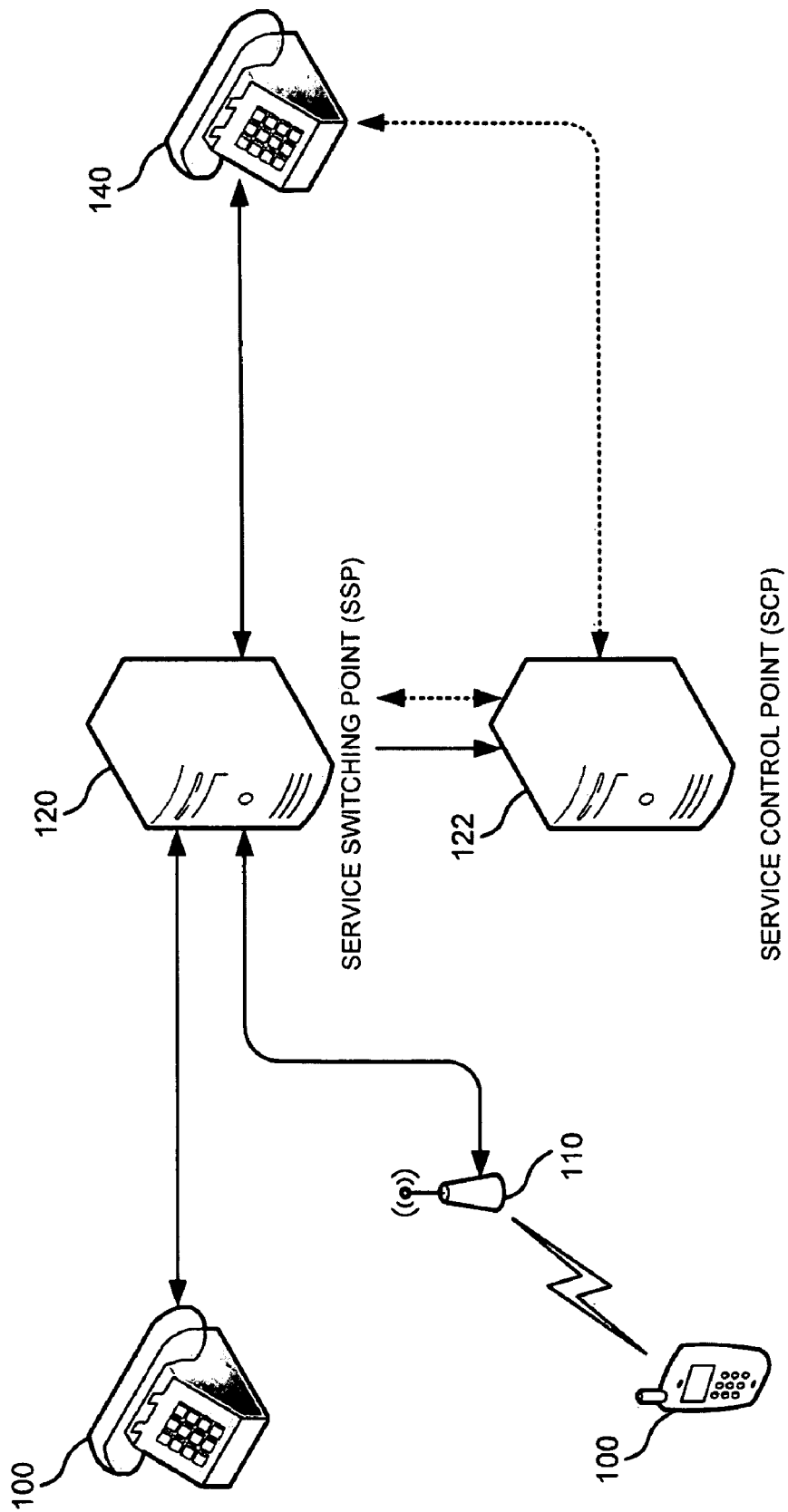
FIG. 1 illustrates a system network diagram of a prior art telephone system.

FIG. 1 illustrates the standard components of a conventional telephone system used to connect a caller to a receiving party 140. To initiate a call, a caller uses a communication device 100, such as a land-line telephone or cellular telephone, to dial a telephone number. The call is received by a Service Switching Point (SSP) 120, which is the telephone exchange that initially responds when a caller dials a number. The SSP 120 may be co-located with the telephone exchange and acts as the trigger point for further services invoked during the call. Depending upon the system implementation and the telephone number dialed, the SSP 120 may send a query to a central database called a Service Control Point (SCP) 122 to obtain information for routing the call to the appropriate receiver. When a call is placed from a land-line the communication device 100 may connect directly to the SSP 120. When a call is placed from a cellular telephone, the call connects to a wireless access point 110 within a cellular communication network which connects the call to the SSP 120. As it is well known in the art, the SSP 120 may use a variety of protocols, such as Signaling System 7 (SS7) protocols which are responsible for the call setup, management, and termination with other SSPs 120. To connect calls, the SSP 120 sends the call to a local SSP 120 based on the area code and the first three digits of the telephone number. The calls are then connected to the receiving party 140 by using the last four digits of the telephone numbers.

The SCP 122, which is also referred to as a Service Control Function, is a separate set of platforms that receive queries from the SSP. The SCP is a standard component of an Intelligent Networks (IN) telephone system which contains service logic that implements telephone services. When the call is placed to a toll-free telephone numbers (e.g., 1-800 numbers), the dialed toll-free number must be identified from a database, such as one associated with a Service Control Point (SCP) 122. For example, when a SSP 120 receives a call to a toll-free number, it recognizes the prefix of, for example, "800" and transmits a query to the SCP 122. SCPs 122 are well known in the telecom industry and may be deployed using SS7, Sigtran or Session Initiated Protocol (SIP) technologies. The SCP 122 may include a Service Data Point (SDP) (not shown separately) which holds the database and directory of subscriber data, or other data required to process a call. Once the destination is identified to the SSP 120, the call may be connected by the SSP 120. This is the mechanism that is used to route 1-800 numbers.

Currently, dialing a telephone number merely connects calls from a caller to a receiving party without taking into account caller or receiving party information. At most caller ID services provide the receiver with the caller's telephone number and registered identity. The inability of the telephone system to take into account caller or receiving party information results in service deficiencies. For example if a New Yorker visiting Seattle, Wash. dials a Pizza Hut® telephone number from his mobile phone's address book, the caller will likely be connected to a Pizza Hut® located in New York. When in Seattle, the telephone number of a local New York Pizza Hut® is useless to a caller. To find a local Pizza Hut® telephone number, the caller must then take additional time consuming steps to review a telephone directory (e.g. the YellowPages) or contact information services (e.g. 4-1-1 directory). Telephone directories do not include hours of operation for their listings. Therefore, the caller must call individual Pizza Hut® restaurant locations to ascertain whether the restaurant is open for business. Similarly, if a caller dials a Pizza Hut® toll-free number, the caller will be connected to a central location, which may be anywhere in the world, and must speak to a representative (or a recording) who would then identify and connect the caller to the final Pizza Hut® destination. When using a toll-free number to find the nearest Pizza Hut® restaurant, callers must provide the representatives (or recordings) their location, such as the street address, city and state. Because callers may not know where they are at, the use of a toll-free number may lead to wrong restaurant locations and be frustrating. While caller ID services may enable call centers to determine the location of callers on landline telephones, this may not be true for cellular telephone users which can place calls from anywhere.

The conventional telephone switching system cannot make use of the wide variety of information sources that are now available. In contrast to the telephone system, the Internet allows users to access limitless sources of information. Businesses are increasingly posting useful information on their websites, and search engines have made finding such information increasingly easy. As a result, the Internet is increasingly replacing telephones and telephone books as the primary source for consumer information. Yet, telephone users are largely isolated from the Internet when they dial a conventional telephone number.

The various aspect methods and systems provide telephone accessible services to callers which are responsive to information about the caller. Such telephone services may be implemented on any telephone number, but in a preferred aspect are implemented as part of toll free telephone services. The aspect methods and systems can make use of caller-specific information, such as the local time and location of the caller, to render better services to the caller. For example, using caller-specific information such as time and location, the system can redirect a call that was placed to a central number on to an operator or business that is open and close by the caller, all without requiring the caller to speak or enter any information. Since such telephone numbers enable enhanced services to callers, as well as the businesses to which such numbers are assigned, these telephone numbers are referred to herein as "hypernumbers."

Various aspects provide a telephone service point configured to provide the services associated with hypernumbers. For ease of description telephone service points which provide hypernumber functionality are referred herein as a "Hypernumber Service Point." The Hypernumber Service Point includes a computer that is configured with software to perform the hypernumber functions described herein and connected to the commercial telephone network so that it can receive calls dialed to hypernumbers assigned to it. Any number of Hypernumber Service Points can be located anywhere within the commercial telephone network, such as, for example, at a centralized call center, within a call center dedicated to a large business, within or connected to one or more SCPs 122 or telephone exchanges, within the network of a cellular telephone service provider, or within a PBX of a business or building. In an aspect, the Hypernumber Service Point is configured as a server that is also coupled to the Internet or another network. A database of settings, instructions and criteria associated with hypernumbers, referred to herein as a "Hypernumber Database," may be included as part of or coupled to the Hypernumber Service Point.

In some aspects, a caller's communication device, such as a cellular telephone, may be configured with a software module to communicate with the Hypernumber Service Point during a call to a hypernumber. For ease of description, this communication device software module is referred to herein as a "Hypernumber Software Module." As described more fully below, the Hypernumber Software Module can gather caller and communication device information and transmit such information to the Hypernumber Service Point during initiation of a hypernumber call.

In the various aspects, the Hypernumber Service Point can be configured to receive calls placed to hypernumbers, obtain caller-specific information from the caller's communication device, and connect the caller to a call receiving party based on the received caller-specific information. The Hypernumber Service Point may also provide the received information to a server of the call receiving party when the call is connected. The Hypernumber Service Point may also provide information to the communication device placing the call. The call receiving party may be a business or individual that is assigned the hypernumber. For example, a hypernumber may be the toll free number of a business In overview, when a caller dials a hypernumber from a mobile phone, the call is routed by an SSP 120 to a Hypernumber Service Point to which the hypernumber is assigned. Upon receiving the call connection, the Hypernumber Service Point attempts to start a communication session with the calling communication device, such as by sending a "ping" or hypernumber notification signal back to the calling communication device. If the communication device is configured with a Hypernumber Software Module, receiving the hypernumber notification signal activates that software module. The Hypernumber Software Module responds back to the Hypernumber Service Point, thereby establishing a communication session between the Hypernumber Service Point and the communication device. If the calling device is not configured with a Hypernumber Software Module, no response will be received to the ping message, so the Hypernumber Service Point may proceed to complete the services appropriate for the dialed hypernumber based upon caller information (e.g., caller ID data) received from the telephone network.

If the calling device includes a Hypernumber Software Module, that software may gather caller-specific information, such as local time and location (e.g., from a GPS receiver within the communication device), and communicate this caller-specific information to the Hypernumber Software Point via the established communication session. In an aspect, the Hypernumber Software Module may request the Hypernumber Service Point to specify the caller-specific information that is appropriate for the hypernumber. In another aspect, the Hypernumber Service Point may request certain caller-specific information as part of the hypernumber notification signal without being queried by the Hypernumber Software Module. The caller information that a communication device 100 may provide to the Hypernumber Service Point 130 may include geographic location (e.g., GPS data), local time, device use history, available electronic coupons stored in communication device memory, ambient noise or photographs, temperature, device specifications (e.g., model and type, operating system and memory capacity), caller's personal information stored on the device, and other information that may be inputted by the caller.

Once the caller-specific information has been communicated to the Hypernumber Service Point, services appropriate for the dialed hypernumber can be provided to the caller. Such hypernumber services may include sending caller-relevant information back to the communication device, providing caller-specific information to the owner of the hypernumber, and/or connecting the caller to an appropriate telephone or call center. The Hypernumber Service Point may determine the response that is appropriate for a particular hypernumber by querying a Hypernumber Database. The query to the Hypernumber Database may include caller-specific information (e.g., local time and location) so that call-appropriate services can be identified. Depending upon the type of business that owns the called hypernumber, the Hypernumber Service Point may send information to the caller's communication device in voice or data format as specified by the business. Similarly, the Hypernumber Service Point may connect the call to a particular operator, call center or receiving telephone as specified by the business and depending upon the caller-specific information.

Any telephone number can be configured as a hypernumber simply by assigning the number to a Hypernumber Service Point and including appropriate call services information in a Hypernumber Database. Alternatively, hypernumbers may be numbers with a particular prefix, such as "1-600," so callers can recognize that they are calling a hypernumber. In a further alternative, toll-free numbers may be configured as hypernumbers by assigning the telephone numbers to a Hypernumber Service Point. In yet a further alternative, standard telephone numbers may be linked to a hypernumber by using well known call-forwarding technologies to forward an incoming call to a Hypernumber Service Point. In yet another implementation, one or many different telephone numbers may be linked to a hypernumber. For example, if a business owns a toll-free number and several regular telephone numbers, all of the different telephone numbers may be linked to one hypernumber. Alternatively, each telephone number may be linked to a different hypernumber. Forwarding calls to a hypernumber allows, for example, a business to register and use a hypernumber while keeping its other telephone numbers, thus, saving on re-marketing its contact information.

In an implementation hypernumbers may be used as "brand numbers," which are numbers that are may be trademarked or otherwise associated with a business identity. Brand numbers may allow callers to call, for example, businesses by entering the businesses' brand name instead of dialing a telephone number. Brand numbers are already implemented for toll-free numbers, such as "1-800-FLOWERS" which is a registered trademark of 1-800-FLOWERS.COM, Inc. By enhancing brand numbers with hypernumber functionality can allow callers to receive more information and services from a call to the brand number. For example, in addition to connecting callers to an operator, hypernumber functionality may transmit a digital catalog to the caller's communication device while informing the operator of the caller's geographic location.

Hypernumbers may be particularly useful to cellular telephone callers who do not have a computer with Internet access available to them. Callers from landline telephones may well have access to their computers, and so may search the Internet to obtain information about a business. In contrast, cellular telephone callers are likely to place calls from locations where a computer is not available. Dialing a hypernumber from a cellular telephone configured with a Hypernumber Software Module may allow the caller to automatically establish a data link to a business in order to receive desired information. For example, a call to a single hypernumber can enable downloading of store locations, hours of operations and menus or catalogs for off line reference.

Figure 2A:
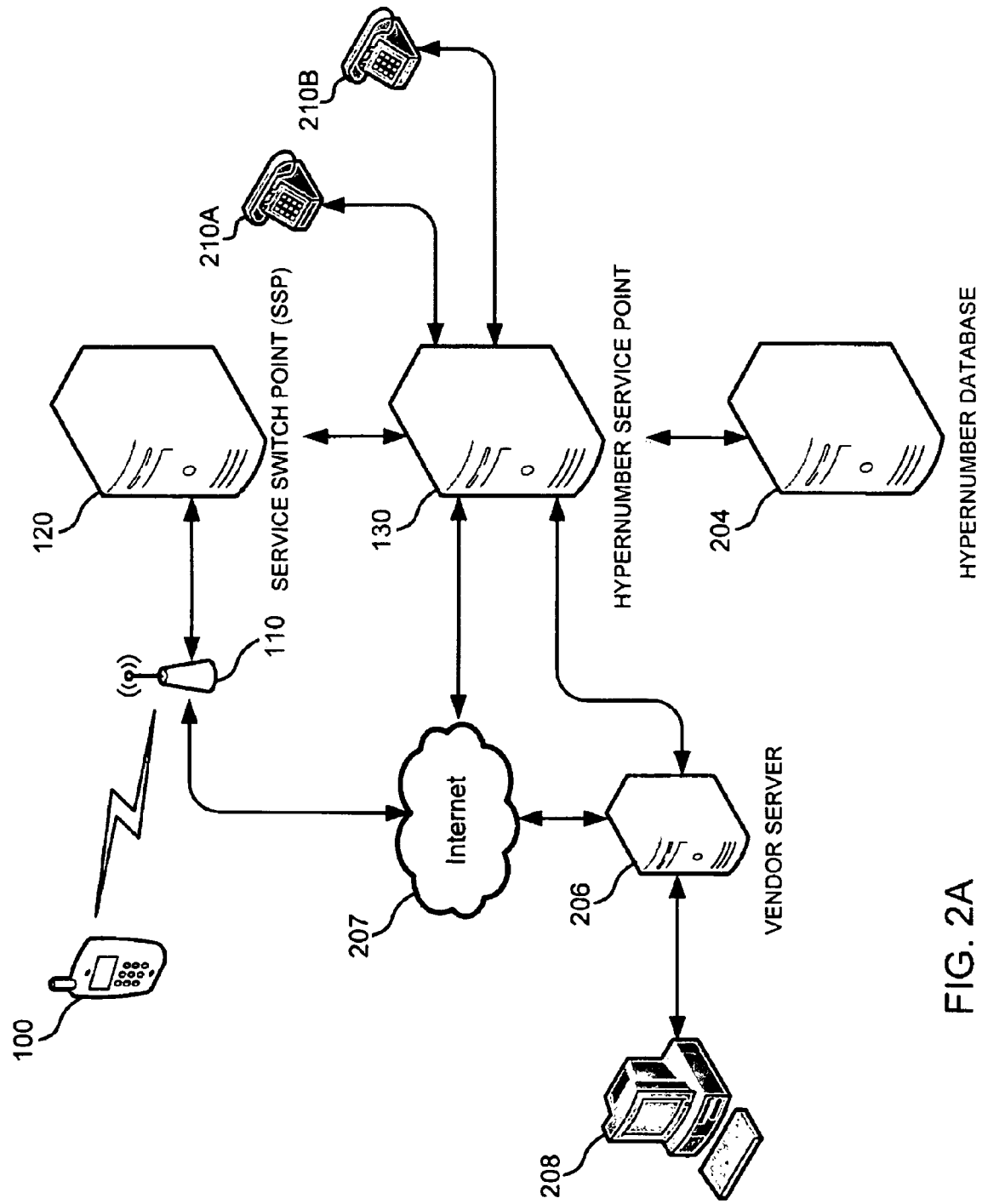
FIGS. 2A-2C are communication network diagrams showing three aspects implementing hypernumbers.
Figure 2B:
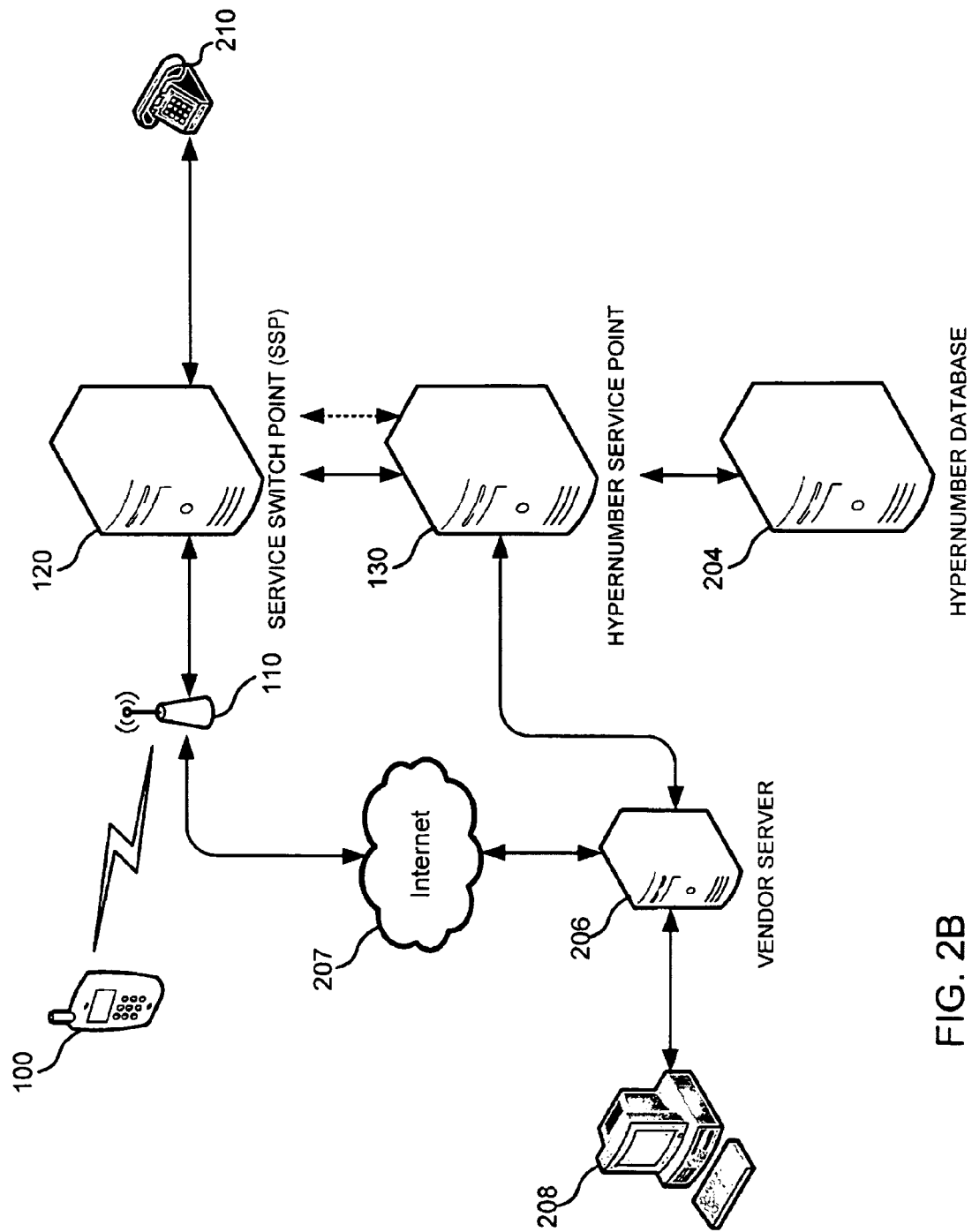

FIGS. 2A and 2B illustrate communication networks of an aspect implementing hypernumbers. When using the dedicated hypernumbers system, a caller may dial a hypernumber and automatically and effortlessly be connected to a suitable receiving party 210, such as the nearest vendor establishment. When a caller uses a communication device 100 to dial a hypernumber, the call may be routed to an SSP 120 via a wireless access point 110 within a cellular service network. The SSP 120 routes the call to a Hypernumber Service Point 130 to which the hypernumber is assigned (e.g., may be determined by an SCP or SDP which are not shown separate from the SSP 120). The Hypernumber Service Point 130 is configured by software to receive and process the incoming hypernumber call. Upon receiving the connection from the SSP 120, the Hypernumber Service Point 130 may perform several tasks before or as part of connecting the caller to the vendor telephone 210, 210A, 210B.

The Hypernumber Service Point 130 may send a message to the communication device 100 to establish a communication session and request caller data. The Hypernumber Service Point 130 request for caller data may be sent via the telephone network, and thus passes through the SSP 120 to the communication device 100 via the wireless access point 110. Alternatively, for those communication devices 100 that are capable of connecting to the Internet, the Hypernumber Service Point 130 may request the communication device 100 to open a communication session via the Internet with a data call being made via the wireless access point 110. Once this wireless Internet communication session is established, the Hypernumber Service Point 130 request for caller data may be transmitted to the communication device 100 via the Internet 207.

The communication device 100 may be configured by a Hypernumber Software Module to receive and respond to the Hypernumber Service Point 130 requests for caller data. Collected caller data may then be communicated by the communication device 100 to the Hypernumber Service Point 130 via the wireless link to the wireless access point 110 and the telephone link through the cellular service network and to the SSP 120. Communication devices 100 not configured by a Hypernumber Software Module may be unable to send a response to the request for caller data from the Hypernumber Service Point 130. Nevertheless, the Hypernumber Service Point 130 may receive caller-specific information from the cellular service provider, including the caller's approximate location.

In the various aspects, the location of a caller may be ascertained using a variety of methods. Communication devices 100 including a built in GPS receiver may determine their location directly. Such directly determined location data can be reported by a communication device 100 configured with a Hypernumber Software Module. Alternatively, the location of the caller may be ascertained by cellular service network. The cellular service network can locate a caller within the communication range (~5 miles) of the wireless access point 110 with which the communication device 100 is communicating. A cellular service provider can determine the caller's location with greater precision by identifying the closest cell towers 110 (or cell sites) to the communication device 100 and calculating the caller's location mathematically by known methods such as triangulation. The cellular service provider can then report the caller's approximate location to the Hypernumber Service Point 130 via either communication link established between the communication device 100 and the Hypernumber Service Point 130 or via a separate network connection, such as via the Internet 207.

In providing a response to a request for caller data, the communication device 100 configured by the Hypernumber Software Module may respond to the Hypernumber Service Point 130 data request by collecting and transmitting caller data to the Hypernumber Service Point 130. Again, this data transmission may be via the communication session established via the telephone connection through the wireless access point 110 and SSP 120 or via a separate wireless data link through the wireless access point 110 to the Internet 207. Caller information received by the Hypernumber Service Point 130 may be used to personalize the service provided to the caller as defined by parameters stored in the Hypernumber Database 204. If, however, the communication device 100 is unable to handle hypernumber calls, the Hypernumber Service Point 130 may connect the call to a default number provided by the owner of the hypernumber, with such defaults stored in the Hypernumber Database 204. For example, a default number may be to a central customer service location where the caller may speak to a representative and ask to be connected to a desired location.

The Hypernumber Service Point 130 may be configured to determine the destination of the hypernumber call by communicating with a Hypernumber Database 204. The Hypernumber Database 204 may be a database or directory of all hypernumber along with their associated routing instructions. Once a hypernumber call is connected to the Hypernumber Service Point 130, the Hypernumber Service Point 130 may query the Hypernumber Database 204 to determine the routing instructions and other services specified by the hypernumber owner. Upon receiving the query from the Hypernumber Service Point 130, the Hypernumber Database 204 may locate the configuration data record(s) with the database using the hypernumber as a search key and provide the data records to the Hypernumber Service Point 130. Using the received routing instructions the Hypernumber Service Point 130 may then connect the call to the hypernumber owner's telephone 210, 210A, 210B.

Storing routing and services configurations and instructions in a Hypernumber Database 204 provides great flexibility for customizing hypernumber services to each business's needs. The hypernumber data records in the Hypernumber Database 204 may specify the items of caller-specific information to request from the communication device 100, specify information to be provided to the communication device 100, specify caller-specific information to report to the vendor's server 206, and specify specific telephones 210A, 210B to which a hypernumber call should be connected. The information provided to a calling communication device 100 may be dependent upon caller-specific information received by the Hypernumber Service Point 130 and included in the query to the Hypernumber Database 204. For example, the query may specify the caller's location and local time, and in response the Hypernumber Service Point 130 may receive information for relay to the communication device that is relevant to that time and location, such as near by and open premises. As another example, the query may specify the caller's location and local time, and in response the Hypernumber Service Point 130 may receive call routing instructions stored in the Hypernumber Database 204 to enable connecting the call to a particular vendor telephone 210A or 210B.

In addition to or as an alternative to the Hypernumber Database 204, the Hypernumber Service Point 130 may communicate via the Internet 207 with a vendor server 206 of the business that owns the called hypernumber. The vendor server 206 may provide the same type of hypernumber settings and configuration data as discussed above for the Hypernumber Database 204. The vendor server 206 may also provide additional information to be transmitted to the communication device 100, such as vendor locations, hours of operation, etc. Also, the Hypernumber Service Point 130 may provide caller data to the vendor server 206. For example, a nationwide vendor owning a hypernumber may elect to maintain vendor information in a vendor server 206 which may be updated from a computer device 208. Information stored on the vendor server may include vendor locations, hours of operations, menus, catalogs, sales, promotions and other data that the vendor would like to communicate to hypernumber callers.

The Hypernumber Service Point 130 may send caller data to the vendor server 206 based on the routing instructions received from the Hypernumber Database 204. The Hypernumber Service Point 130 may also query the vendor server 206 to receive routing instructions to identify the proper vendor store 210A or 210B to receive the incoming call. The vendor server 206 may evaluate the caller information and identify the most suitable vendor store location 210A, 210B. Routing instructions to the vendor store 210A, 210B may be transmitted to the Hypernumber Service Point 130. The Hypernumber Service Point 130 may then connect the call to the specified vendor store 210A, 210B. The Vendor server 206 is optional as the Hypernumber Service Point 130 and/or the Hypernumber Database 204 may be configured to maintain vendor information.

The Hypernumber Service Point 130 may connect the caller to the receiving party 210, 210A, 210B using a variety of different connection types. For example, as shown in FIG. 2A, once the destination of the hypernumber is ascertained, the Hypernumber Service Point 130 may connect the call to the appropriate vendor store 210A using a voice over IP (VOIP) connections. By converting voice communications into VOIP format, telephone calls can easily be routed via the Internet 207 and processed using standard Internet router equipment. Alternatively, as shown in FIG. 2B, the Hypernumber Service Point 130 may transmit routing instructions (shown in a dotted arrow line) to the SSP 120 which in turn can connect the caller to the suitable vendor store using regular telephone circuits.

In an aspect, the Hypernumber Service Point 130 can send instructions (e.g., an appropriately configured POST command) to the communication device 100 to cause it to establish an Internet connection with the vendor server 206 so the communication devices 100 can receive data via the Internet 207. Such a parallel Internet connection may allow the vendor server 206 to directly provide the communication device 100 with additional information much as if the caller had accessed the vendor's website via the Internet 207. Information transmitted from the vendor server 206 to the communication device may include store locations, hours of operation, menus, catalogs, promotions, sale events and driving directions to the nearest stores. For example, communication devices 100 equipped with a GPS receiver may be configured by the Hypernumber Software Module to receive driving directions from the vendor server 206 via the Internet 207 for display by the GPS software. This capability can eliminate the steps of inputting directions into the GPS software which may be safer for callers who, for example, call the hypernumber while driving. The ability to transmit data to a communication device 100 then allows businesses to provide efficient and effective services to callers without burdening them with large amounts of information transmitted by voice.

Owners of hypernumbers may continually update their information, settings and configurations stored in the Hypernumber Database 204 in order to provide callers with up to date data. For example, it may be important to update the business's hours of operation, holiday closings, closed stores, new locations, sale dates and new promotions. A vendor may update its information stored in the Hypernumber Database 204 by accessing the database via the Internet 207 from a computer 208. If the business's information is maintained on a vendor server 206, that server can be updated by accessing the server and manually inputting data using a computer 208. Alternatively, the vendor may update their information by programming the vendor server 206 to automatically update its databases or the Hypernumber Database 204 by accessing and periodically skimming data presented on the vendor's website or vendor store websites.

In an exemplary aspect, depending on the caller data received, the vendor server 206 may need to present a caller with a series of selections or menus, referred to herein as call "task options," before identifying a suitable call connection. Task options may be required in situations where more than one connection may be suitable based on the received caller data. For instance, the caller may be located nearest to a vendor store 210A in Minneapolis, but the caller data transmitted to the Hypernumber Service Point 130 indicates that an electronic coupon is stored in the communication device 100 that is valid at a vendor store 210B in St. Paul. In such a scenario, the vendor server 206 or the Hypernumber Database 204 may provide a list of task options to the caller to enable the caller to make a selection. Such task options may include the closest locations (i.e., vendor store 210A) or closest locations at which the e-coupon may be redeemed (i.e., vendor store 210B).

When the vendor server 206 or Hypernumber Database 204 determines that task options should be provided to the caller, it may send the task option instructions to the Hypernumber Service Point 130. Based on these instructions, the Hypernumber Service Point 130 may then connect the caller to a live customer representative, pre-recorded instructions, or to a voice-activated computerized menu system. In communication devices 100 capable of accessing the Internet 207, the vendor server 206 may alternatively send the task options to the communication device 100 via the Internet 207. When the caller selects a desired task option, the vendor server 206 or the Hypernumber Database 204 may be queried to provide specific call routing instructions to the Hypernumber Service Point 130. The call may then be connected to the final destination based on those instructions.

Figure 2C:
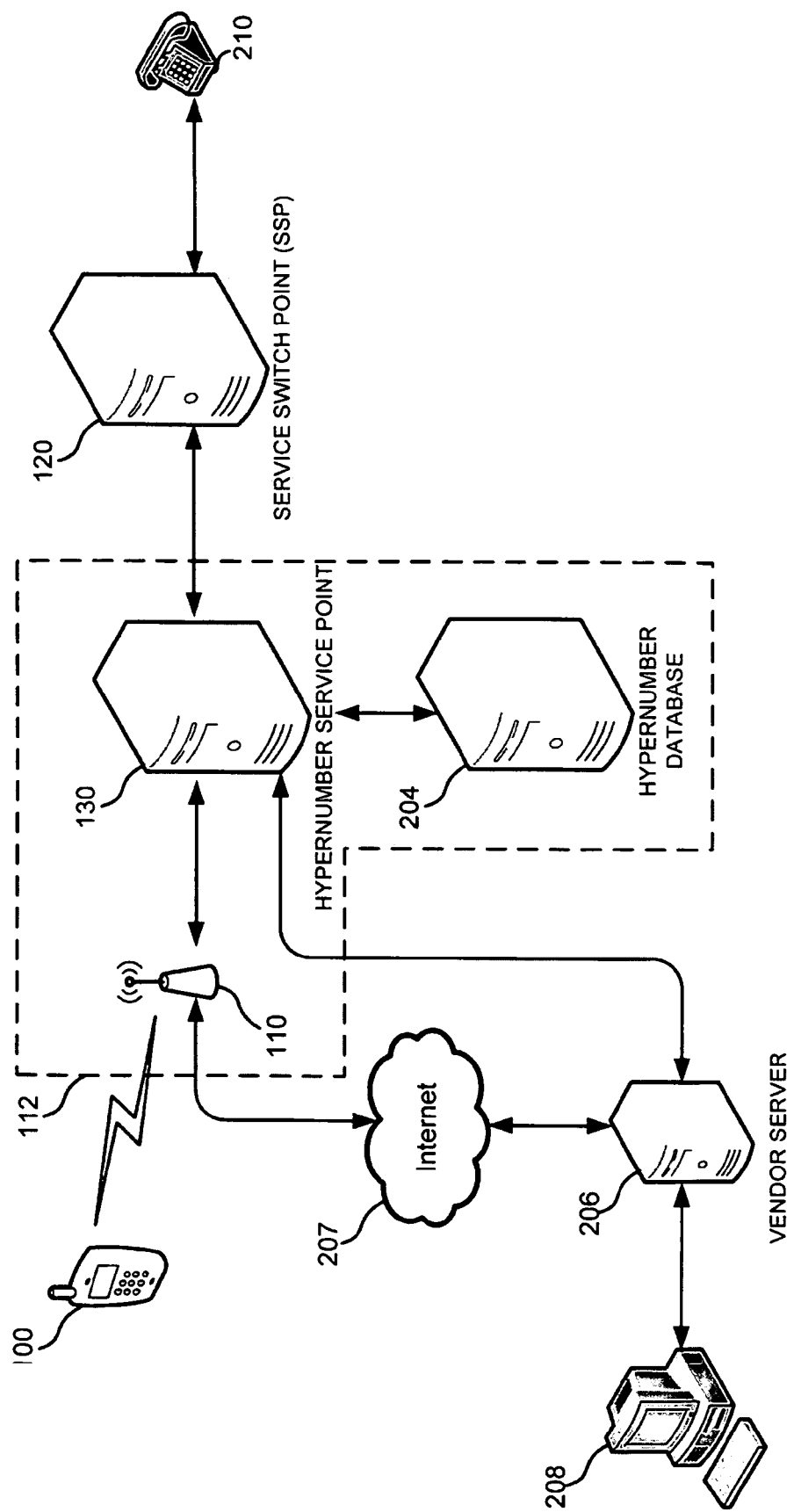

In an alternative aspect illustrated in FIG. 2C, the Hypernumber Service Point 130 and the Hypernumber Database 124 may be located within the cellular telephone service provider's network 112. In this aspect, an incoming call to a hypernumber may be recognized by switches within the cellular service network 112 and connected directly to the Hypernumber Service Point 130 instead of to a telephone network SSP 120. The Hypernumber Service Point 130 may communicate with the communication device 100 via the wireless access point 110 to establish a communication session, request caller data, receive caller data and provide hypernumber-related information to the caller in the manner described above with reference to FIGS. 2A and 2B. Once the Hypernumber Service Point 130 determines the proper routing for the hypernumber call, it can provide that routing information to the SSP 120 to enable the call to be connected directly to appropriate vendor telephone 210. Other functioning and capabilities of the communication system may be similar to those described above with reference to FIGS. 2A and 2B except that communications between the Hypernumber Service Point 130 and the communication device 100 may not go through the SSP 120.

The aspect illustrated in FIG. 2C may be implemented when the cellular service provider is also the provider of hypernumber services. This implementation enables the full implementation of hypernumber functionality within the cellular service without impacting the public switch telephone network. Also, this implementation may enable the service provider to control the configuration of communication devices 100, such as by ensuring that the devices' Hypernumber Software Module is compatible with the Hypernumber Service Point 130 functionality.

Figure 3A:
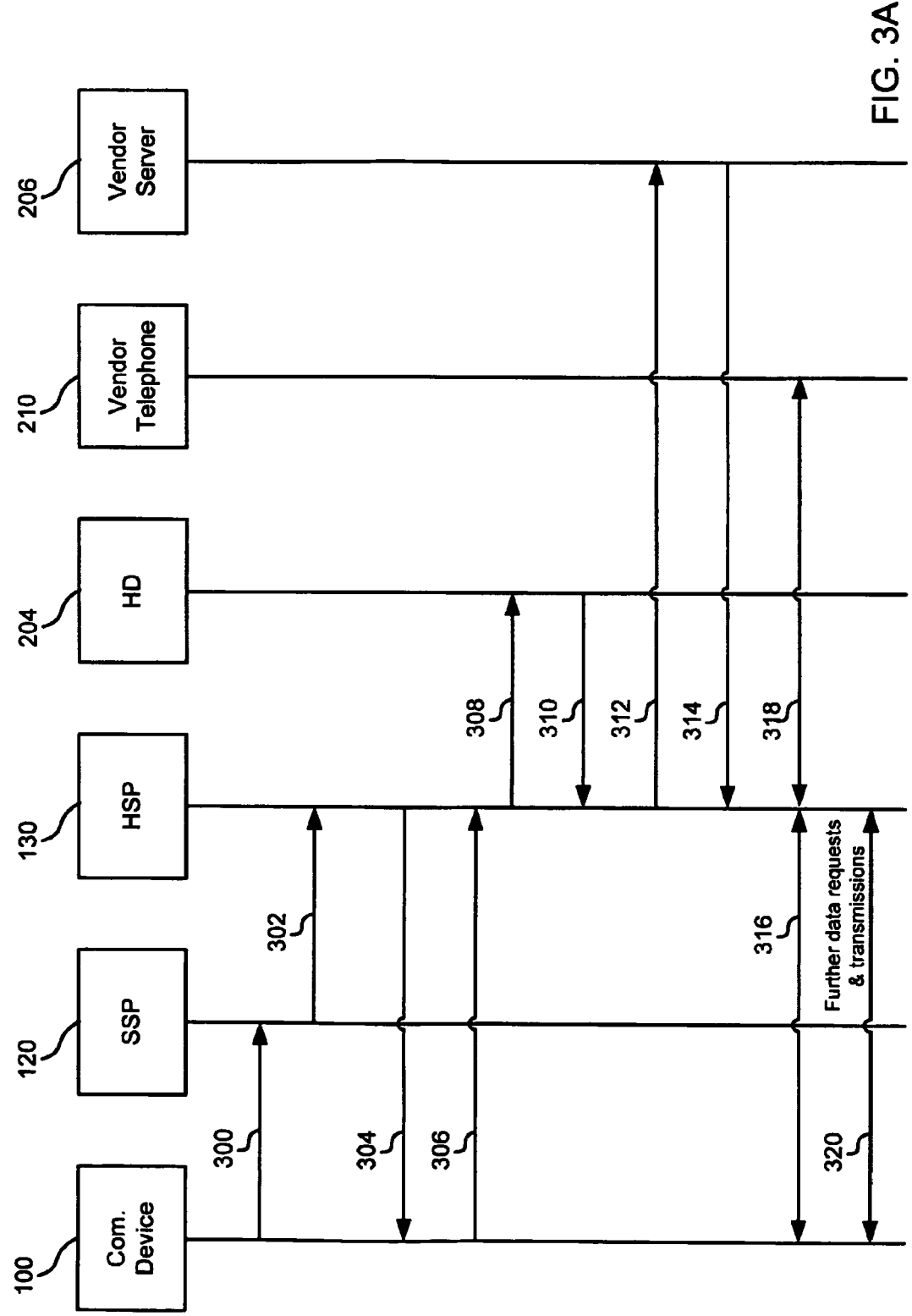
FIGS. 3A and 3B are message flow diagrams of communications involved in the aspect systems illustrated in FIGS. 2A and 2B.
Figure 3B:
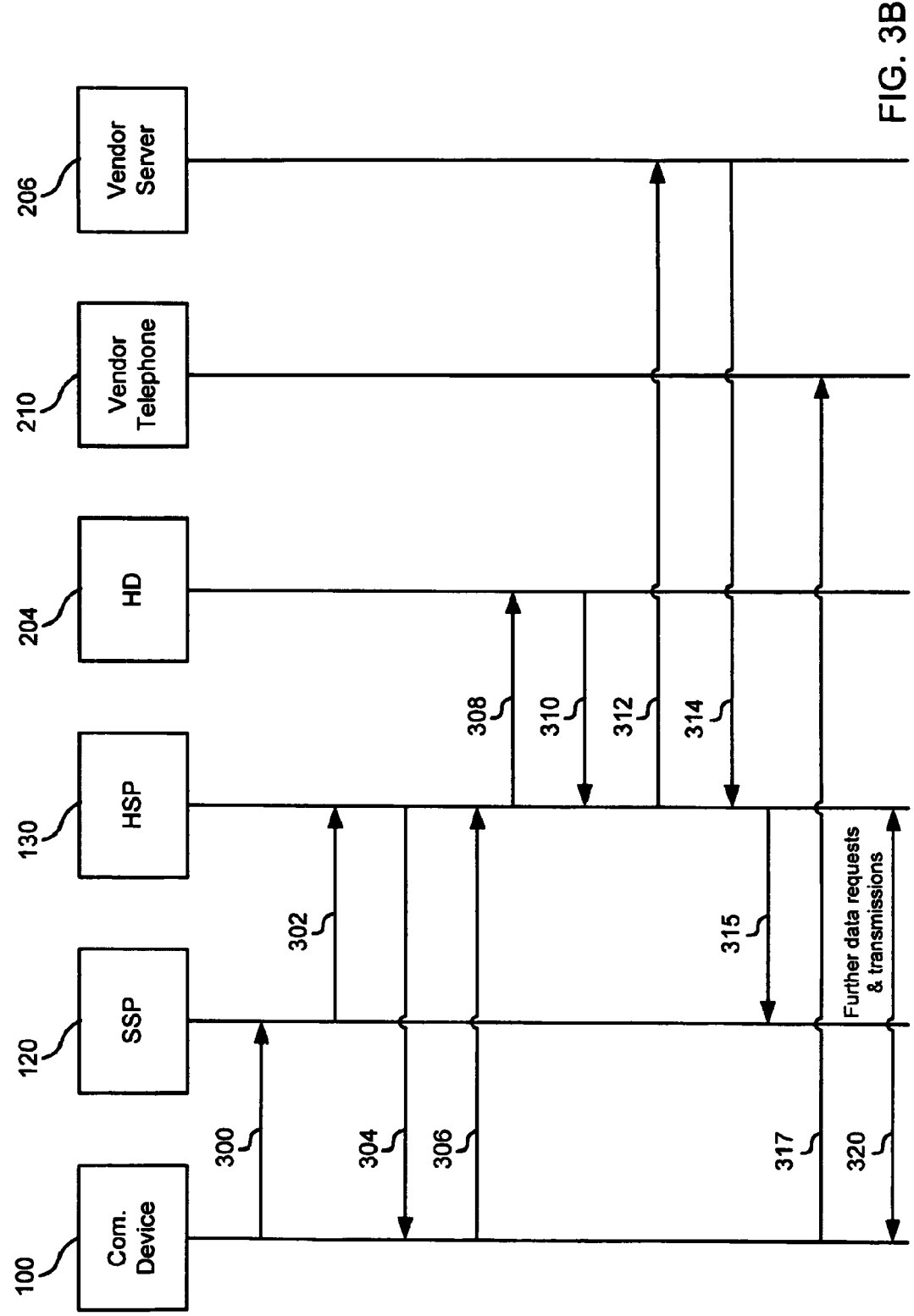

FIGS. 3A and 3B are message flow diagrams showing how a hypernumber call may be connected to the final destination in a series of communications among the system participants illustrated in FIGS. 2A and 2B. For sake of simplicity, signaling to and among cellular telephone service components are not illustrated, but would be consistent with standard wireless voice and data telecommunication messages.

Referring to FIG. 3A, when a caller dials a hypernumber on a communication device 100, the call may be routed to the SSP 120, message 300, which in turn may route the call to the Hypernumber Service Point 130, message 302. The Hypernumber Service Point 130 ("HSP" in FIGS. 3A and 3B) may send a ping or hypernumber notification signal along with a request for caller data to the communication device 100, message 304. Upon receipt of the request from the Hypernumber Service Point 130, the Hypernumber Software Module of the communication device 100 may be activated to collect and transmit caller information to the Hypernumber Service Point 130, message 306. The Hypernumber Service Point 130 may query the Hypernumber Database 204 ("HB" in FIGS. 3A and 3B) for configuration and instructions (e.g., routing instructions), message 308. Upon receipt of the query, the Hypernumber Database 204 may identify data records storing the configuration and instructions associated with the dialed hypernumber. The Hypernumber Database 204 may then transmit to the Hypernumber Service Point 130 the appropriate configuration and instructions, message 310. The Hypernumber Service Point 130 may also transmit caller data to the vendor server 206, message 312, and receive information and routing instructions from the vendor server 206, message 314. Using the received data the Hypernumber Service Point 130 can connect the call to the appropriate vendor store's telephone 210, messages 318.

As shown in FIG. 3A, the Hypernumber Service Point 130 may handle the call connection by using the routing instructions received from the Hypernumber Database 204 and/or the vendor server 206. In cases where the Hypernumber Service Point 130 handles the call connection, the connection between the caller and the Hypernumber Service Point 130 may be via regular telephone circuits, messages 316, while the connection between the Hypernumber Service Point 130 and the vendor store's telephone 210 may be via VOIP, messages 318.

Alternatively, as shown in FIG. 3B, the call connection may be handled by the SSP 120. In this situation, the Hypernumber Service Point 130 transmits the routing instructions (i.e., destination telephone number) received from the Hypernumber Database 204 and/or vendor server 206 to the SSP 120, message 315. The SSP 120 then manages the call and connects the communication device 100 directly to the vendor store telephone 210 using the public switched telephone network, messages 317.

As mentioned with reference to FIGS. 2A and 2B, the Hypernumber Service Point 130 may also send data to the communication device 100 via the established communication session or an Internet communication session, messages 320. These messages may provide transmit vendor information, such as establishment locations, hours of operation, menus, catalogs, sale and promotion messages, etc. Since such communications session may be two-way, the communication device 100 (as configured by the Hypernumber Software Module) may also provide additional caller data to the Hypernumber Service Point 130. While not illustrated in FIGS. 3A and 3B, similar data transmissions also or alternatively may be completed between the communication device 100 and the vendor server 206 via an Internet communication session. For example, the Hypernumber Service Point 130 or the vendor server 206 may transmit task options to the communication device 100 and receive caller selections in response.

Figure 4:
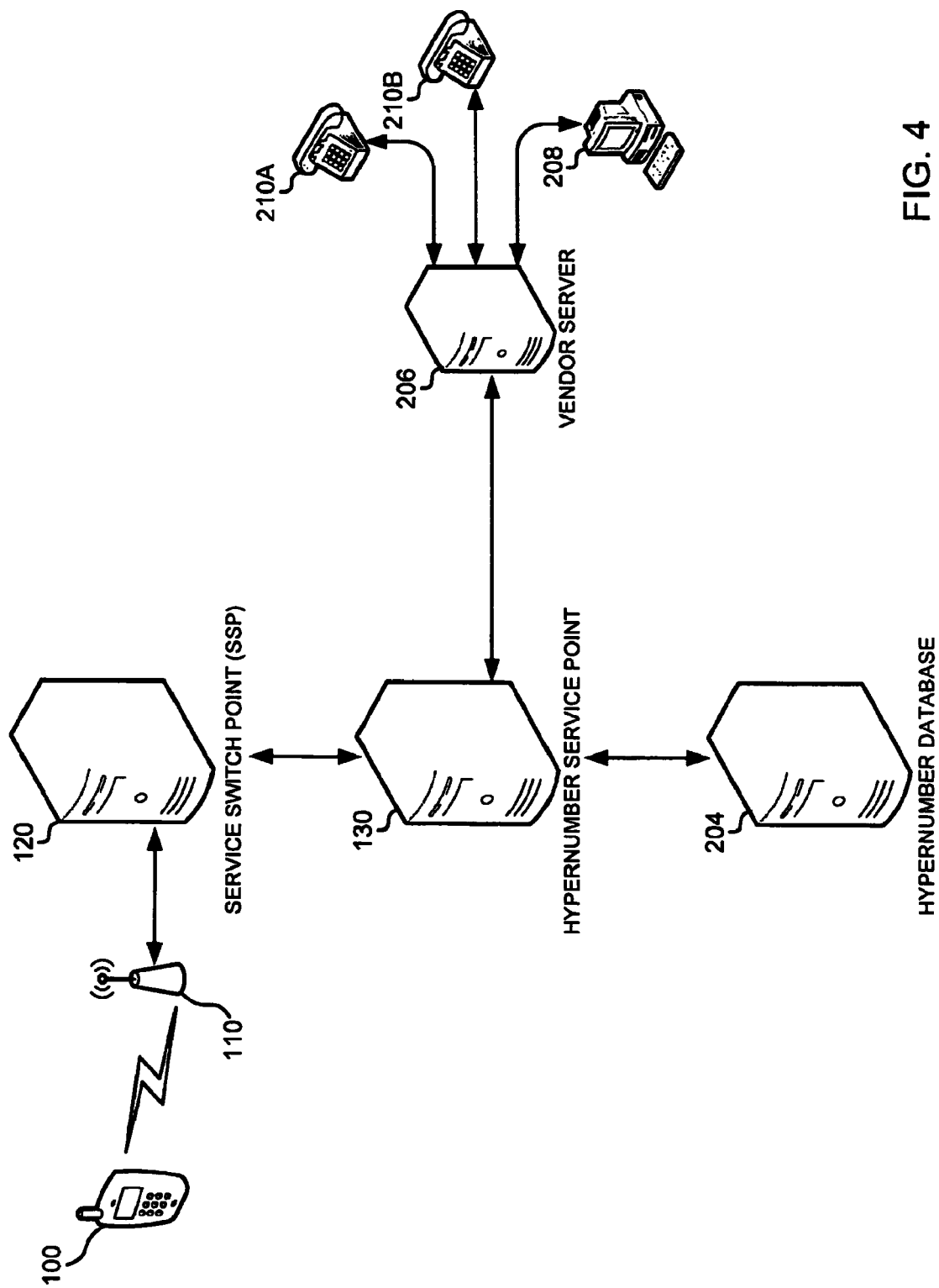
FIG. 4 is a communication network diagram of an alternative aspect.

In an alternative aspect shown in FIG. 4, the call may be connected between the Hypernumber Service Point 130 and the vendor server 206 which then connects the call to a particular telephone 210A, 210B. In this aspect, the call may be routed between the Hypernumber Service Point 130 and the vendor server 206 as a VOIP transmission via the Internet (not shown), with the vendor server 206 converting the VOIP packets into ordinary telephone signals. When a caller dials a hypernumber the call may be received by the SSP 120 and routed to the Hypernumber Service Point 130. The Hypernumber Service Point 130 may send a request for caller data to the communication device 100 and also query the Hypernumber Database 204 for routing instructions. Upon receipt of caller data from the communication device 100 and routing instructions from the Hypernumber Database 204, the Hypernumber Service Point 130 directs the call to the vendor server 206 in a VOIP communication. The vendor server 206 may decode the VOIP packets and manage the call distribution and connection to vendor store telephones 210A, 210B. In this aspect the vendor server 206 may receive and evaluate the caller data in order to connect the call to a particular telephone 210A, 210B that most appropriate to receive the call. If more then one vendor store telephone 210A, 210B is suitable for receiving the call, the vendor server 206 may transmit to the caller with a list of task options. By selecting the appropriate task options, the caller may guide the vendor server 206 to establish a connection to a particular vendor store telephone 210A or 210B. For example, if the caller is located near vendor store 210A but an electric coupon is stored on the communication device 100 that may be redeemed at vendor store 210B, the vendor server 206 may provide the caller the a choice of connecting to either vendor store 210A or vendor store 210B. When the caller selects one option, the vendor server 206 can connect the caller to the selected vendor store's telephone 210A, 210B. As discussed in more detail above with reference to FIGS. 2A and 2B, the vendor server 206 may be updated periodically using a computer device 208.

Figure 5:
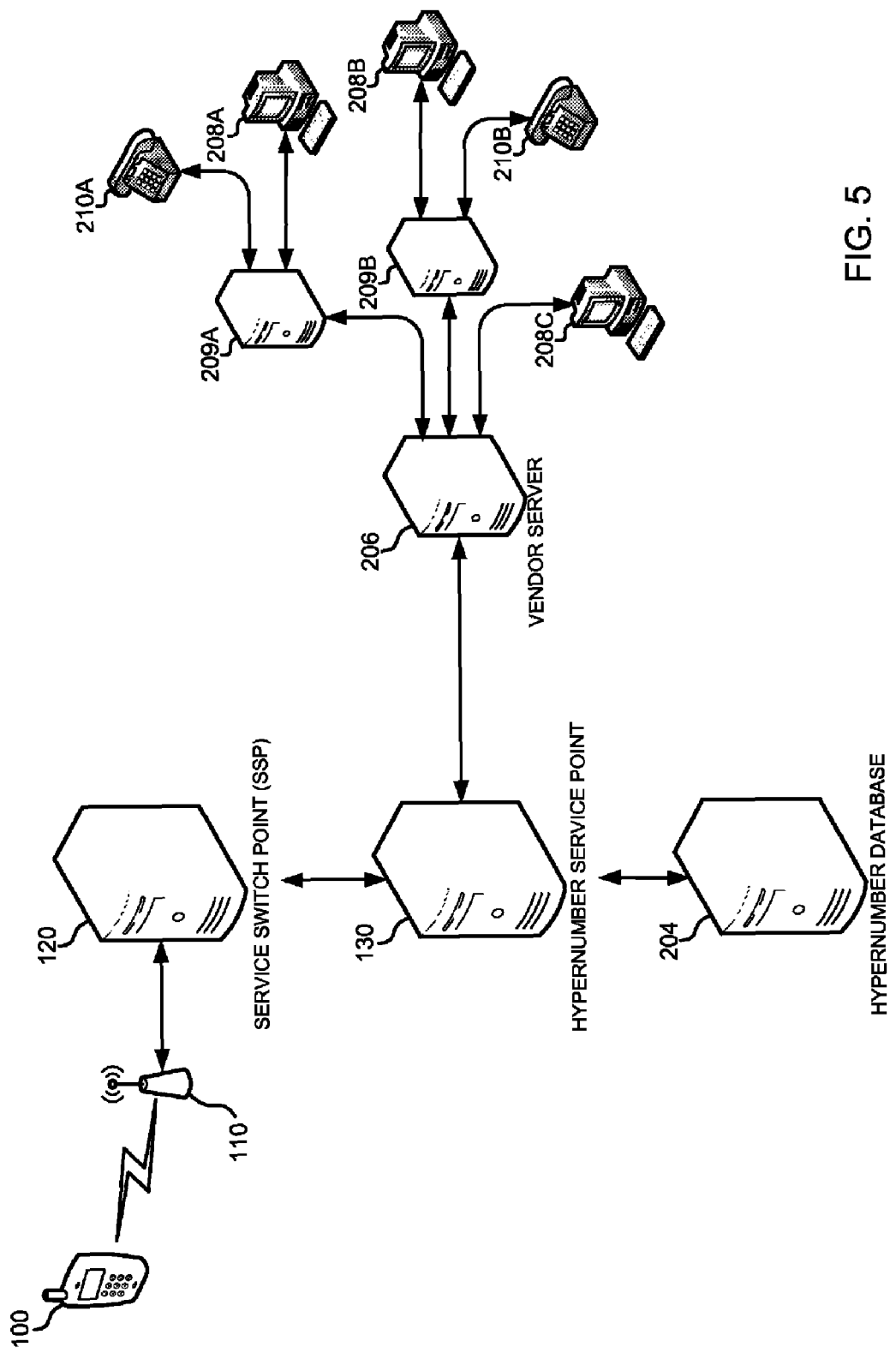
FIG. 5 is a communication network diagram of an alternative aspect.

In another aspect illustrated in FIG. 5, hypernumber call distribution and connection may be managed by a network of vendor servers 206, 209A, 209B. When a caller dials a hypernumber, the call may be routed to the Hypernumber Service Point 130 via the SSP 120. The Hypernumber Service Point 130 may request caller data by sending a query to the communication device 100. The Hypernumber Service Point 130 may also query the Hypernumber Database 204 for routing instructions and other information. Upon receipt of information from the communication device 100 and routing instructions from the Hypernumber Database 204, the Hypernumber Service Point 130 may route the call (e.g., as a VOIP call via the Internet) along with the received caller information to the appropriate vendor server 206. As shown in FIG. 5, each vendor store may manage its own vendor store server 209A, 209B. Such an arrangement allows each vendor store to update its own business information using a computer device 208A, 208B independently from other vendor stores. The vendor server 206 may have access to each vendor store server 209A, 209B and may be automatically updated as each vendor store server 209A, 209B is updated. Since the task of updating vendor store information is delegated to individual stores, business information from each vendor server 209A, 209B may be updated in a timely manner and the management of such updates made easier. Additionally, the vendor server 206 may be managed and updated using a separate computer device 208C.

Vendor store servers 209A, 209B may also be able to manage and distribute calls to different department telephones 210A, 210B in the same store based on the caller data received (not shown). Calls may be routed from the vendor server 206 to the store servers 209A, 209B as VOIP calls, such as by the vendor server 206 routing the VOIP packets via the Internet. When the call is received at the vendor store server 209A or 209B, that server may provide the caller with a new set of task options which would allow the caller to select an appropriate department within the vendor store. Alternatively, the vendor store server 209A, 209B may automatically connect the caller to a department telephone 210A, 210B based on the received caller data. For example, information about electronic coupons stored on callers' communication devices 100 may be received by the vendor store server 209A, 209B. Based on the value and validation date of the electronic coupon and the type of items it covers, the vendor store server 209A, 209B may connect the call to a suitable department telephone 210A, 210B.

In an aspect, a hypernumber may be implemented by using call forwarding technology. In a first implementation, a call placed to an ordinary telephone number (e.g., a toll free number) may be redirected at the SSP 120 to the Hypernumber Service Point 130. This implementation will function essentially the same as when the dialed number itself is a hypernumber. For example, a business which already owns a toll-free number may set up call forwarding on that number to redirect it to a particular hypernumber. This implementation enables businesses to selectively direct calls to either their ordinary telephone number or a hypernumber simply by activating or deactivating call forwarding.

Figure 6:
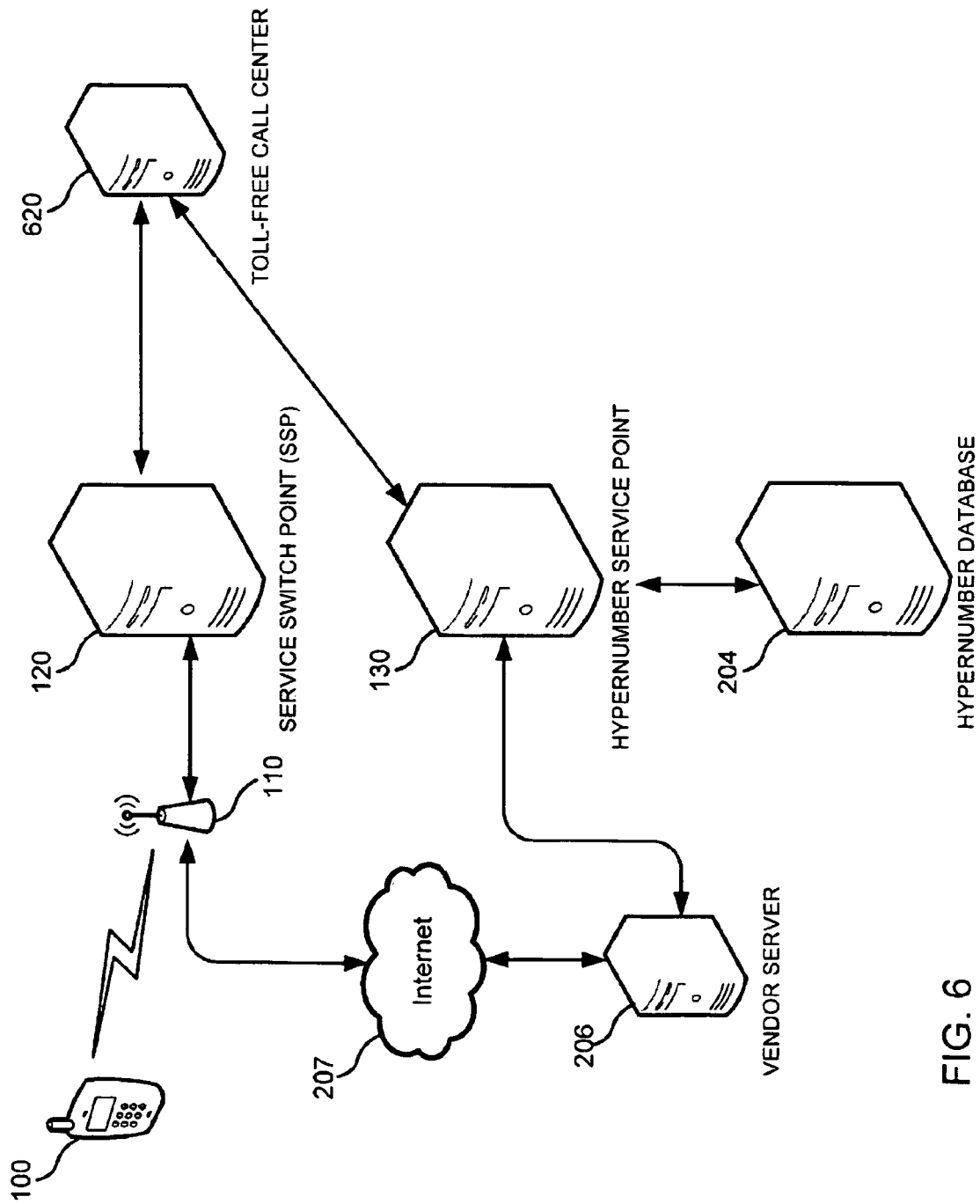
FIG. 6 is a communication network diagram of an aspect using loaded toll-free telephone numbers.

In a second implementation of call forwarding illustrated in FIG. 6 a call center 620 for a toll-free telephone number may redirect calls to a Hypernumber Service Point 130. When a caller dials a toll-free number, the SSP 120 may direct the call to a call center 620. The call center 620 may then forward the call (e.g., as a forwarded call or a VOIP call) to a Hypernumber Service Point 130. The Hypernumber Service Point 130 may query the Hypernumber Database 204 to determine services and information requests linked to the hypernumber. Based upon instructions received from the Hypernumber Database 204 may request caller data from the communication device 100 via the connection established through the call center 620. Upon receipt of the caller data, the Hypernumber Service Point 130 may transmit the caller data to a vendor server 206 or the call center 620 depending upon the routing instructions received form the Hypernumber Database 204.

Figure 7:
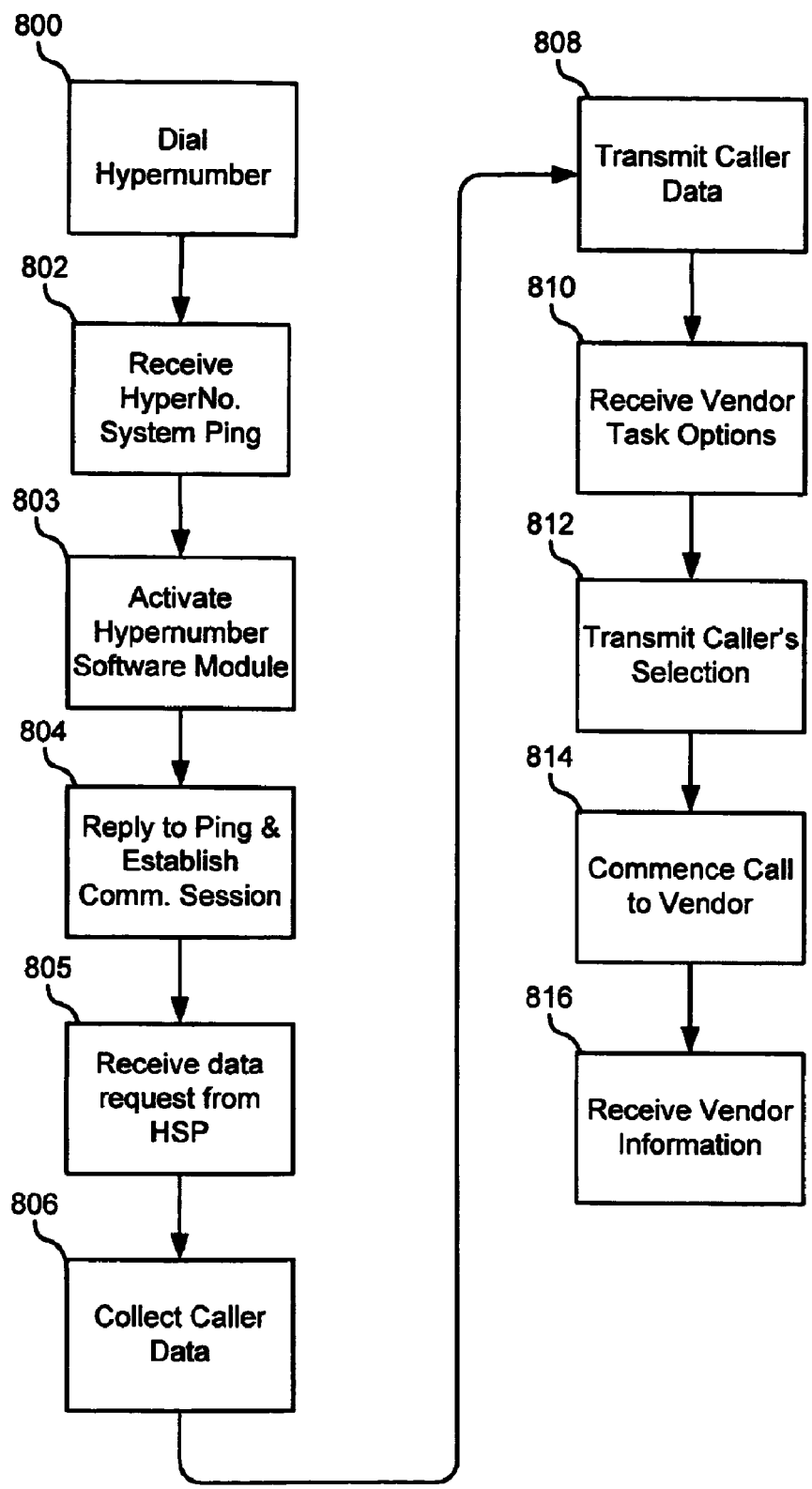
FIGS. 7-9 are process flow diagrams of three aspects methods for implementing hypernumbers.

FIG. 7 is a process flow diagram of a first aspect method for implementing hypernumber functionality on a mobile communication device 100. The caller dials a hypernumber just like any other telephone number, block 800. The hypernumber call is routed to a Hypernumber Service Point 130 which answers the call and sends back a ping or hypernumber notification signal that is received by the communication device, block 802. Reception of this hypernumber notification signal may prompt the Hypernumber Software Module within the communication device 100 to activate (e.g., becomes an active string within the software executing in the processor), block 803, if the module is not already active. The Hypernumber Software Module may establish a communication session with the Hypernumber Service Point by replying to the hypernumber notification signal, block 804. As part of (or just after) replying to the hypernumber notification signal and establishing a communication session the Hypernumber Software Module may also query the Hypernumber Service Point for the type of caller-specific information to be collected and transmitted (included within block 804 in FIG. 7). Upon establishing the communication session, and in some implementations upon receiving a query regarding requested information, the Hypernumber Service Point 130 may transmit an information request identifying the desired caller information. This request may be in the form of a code, text string or symbol which the Hypernumber Software Module can recognize and interpret. In response to receiving this information request, block 805, the Hypernumber Software Module may collect the requested information, block 806. For example, the Hypernumber Software Module may obtain some information from values stored in memory, such as data stored in time and date memory buffers, or device settings data stored in nonvolatile memory. The Hypernumber Software Module may also query other software modules or services, such as requesting GPS coordinate data from a GPS receiver module. As the requested information is collected it may be transmitted to the Hypernumber Service Point, block 808.

Depending upon the services specified by the owner of the dialed hypernumber in data records stored in the Hypernumber Database 204 or vendor server 206, the Hypernumber Service Point 130 may send further communications to the caller's communication device 100. For example, a hypernumber owner that is a business may configure the Hypernumber Database 204 with settings to cause the Hypernumber Service Point 130 to transmit information to the caller. Such additional information may be sent to the caller as a prerecorded message or a menu of task options, such as in series of voice-prompt menu selections or a data message that may be displayed on the communication device, optional block 810. If such a menu of task options is provided, the caller's selection(s) may be transmitted to the Hypernumber Service Point 130, optional block 812, such as in the form of key entries or voice sounds. As another example, the hypernumber owner may configure the Hypernumber Service Point 130 with settings stored in the Hypernumber Database 204 to connect the caller to a particular receiving device, such as a telephone, operator or call center, block 814. As described herein, the call connection may be by redirecting the call via instructions communicated to an SSP 120 or by extending the call via a VOIP connect to a particular VOIP receiver IP address, such as a vendor server 206. Additionally, the Hypernumber Service Point 130 may provide instructions to the communication device to cause it to open a data communication session with the vendor server 206 of the hypernumber owner so that the communication device can receive information directly from the vendor server 206, block 816. For example, the Hypernumber Service Point 130 may send a POST command to the communication device including executable code (e.g., an XML script) and the vendor server's IP address to prompt the communication device 100 to open a communication session with the vendor server 206. Alternatively, the Hypernumber Service Point 130 may provide an address (e.g., e-mail or telephone number) so that the vendor server 206 can send information directly to the communication device 100, such as in the form of an e-mail, SMS (Simple Message Service) or MMS (Multimedia Message Service) message, block 816.

Figure 8:
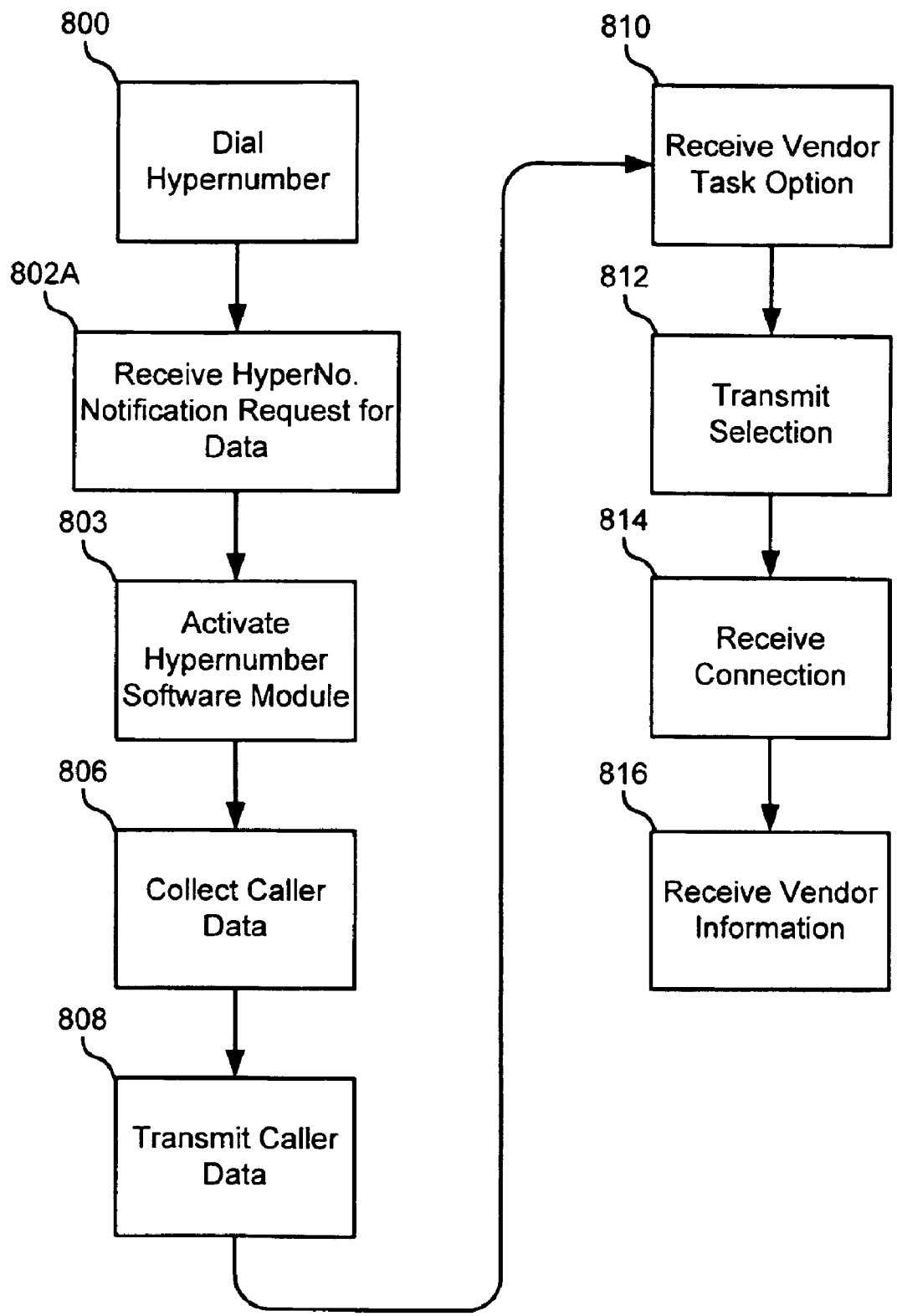
Figure 9:
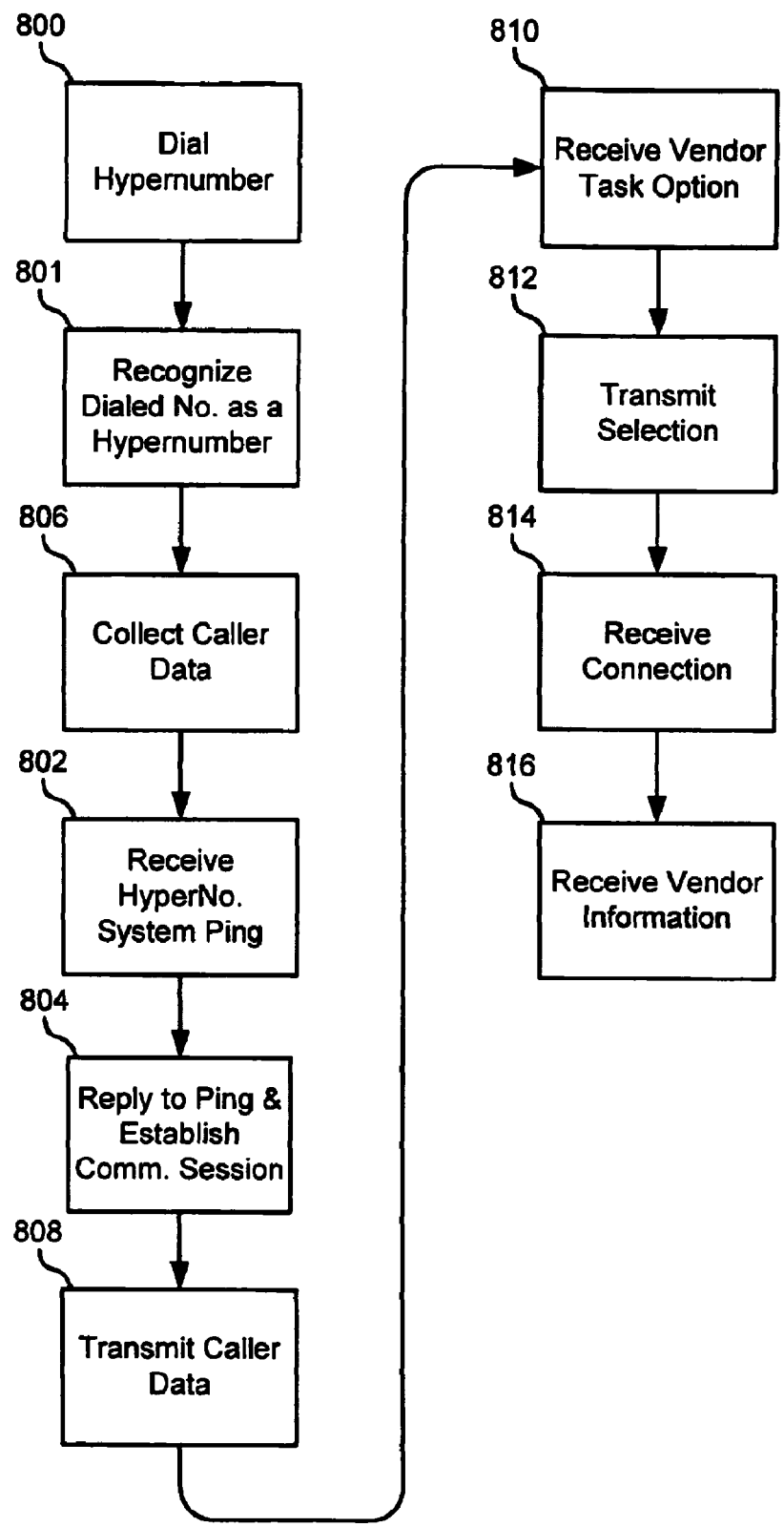

FIGS. 8 and 9 illustrate process flow diagrams of alternative aspect methods for implementing hypernumber functionality on communication devices 100. FIG. 8 illustrates an aspect method for communicating with hypernumbers using a one-step handshake. FIG. 9 illustrates an aspect method for communicating with hypernumbers in which the communication device 100 automatically recognizes hypernumbers as they are dialed.

Referring to FIG. 8, once a caller dials a hypernumber, block 800, the communication device 100 may receive a hypernumber notification/request for data, block 802. This hypernumber notification/request may include both the notification that the dialed number is a hypernumber along with a request for information desired for the dialed hypernumber, block 802A. Thus, in this aspect, the hypernumber notification/request, block 802A, combines the hypernumber notification signal of block 802 and the information request of block 805 described above with reference to FIG. 7. When a hypernumber notification/request for data is received, the Hypernumber Software Module may be activated, block 803, if it is not already activated. The Hypernumber Software Module may then collect the requested caller data, block 806, and transmit the data to the Hypernumber Service Point 130, block 808, as described above with reference to FIG. 7. The remaining blocks illustrated in FIG. 8 may proceed in the manner described above with reference to FIG. 7 for like numbered blocks.

In the aspect illustrated in FIG. 9, the communication device may be configured with software so that as a caller dials a number, block 800, the Hypernumber Software Module automatically recognizes that a hypernumber is being dialed, block 801. This may be accomplished, for example, by storing hypernumbers in memory of the communication device and performing a table look up of the dialed number. As another example, hypernumbers may be recognized based upon a portion of the number, such as the area code (e.g., "600"). Upon recognizing a dialed hypernumber, the Hypernumber Software Module may automatically collect certain caller data, block 806, such as local time and location. Then, once the call is connected to a Hypernumber Service Point 130 and a communication session is established, blocks 802, 804, the Hypernumber Software Module can immediately transmit caller data, block 808. This automatic recognition of hypernumbers may speed the hypernumber processing since the caller data can be collected while the call is being connected through the public switch telephone network. The remaining blocks 810-814 are similar to like numbered blocks described above with reference to FIG. 7.

Processes implemented within communication devices 100 for dialing numbers that are configured for call forwarding or brand numbers are substantially the same as those described above with reference to FIGS. 7-9. Forwarded calls appear to the communication device to be little different from a direct hypernumber telephone call. Similarly, a call to a brand number appears largely the same as a call to a simple hypernumber.

Figure 10:
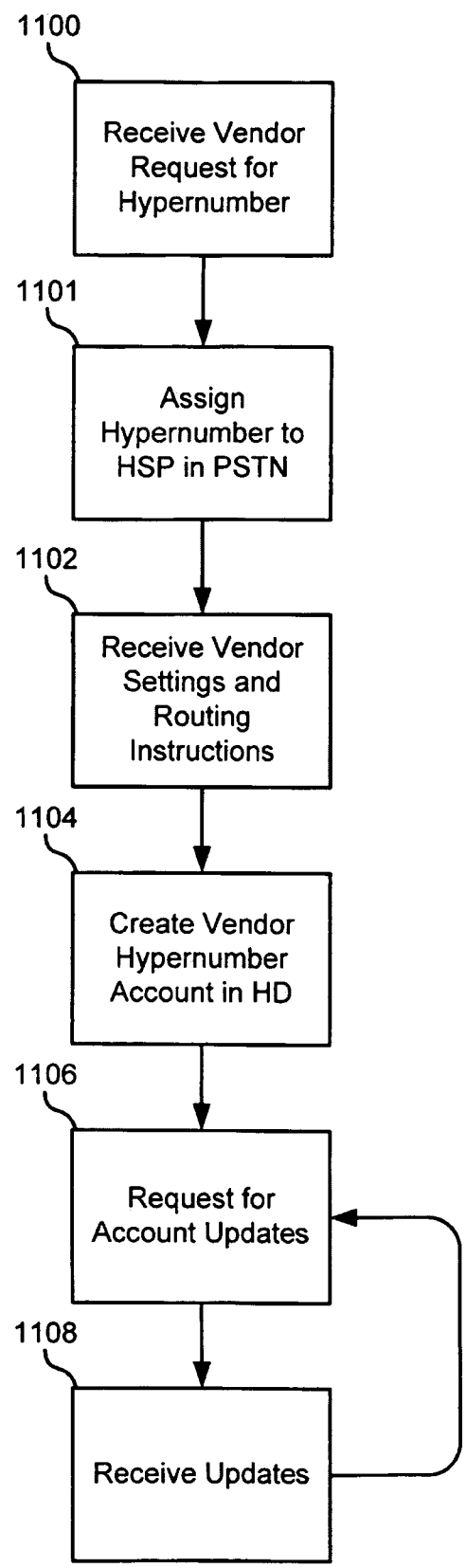
FIG. 10 is a process flow diagram of an aspect method for registering hypernumbers.

Hypernumbers may be offered to businesses by a hypernumber service provider (i.e., an entity that controls and operates the Hypernumber Service Point). A hypernumber can be created by assigning a telephone number to the Hypernumber Service Point 130 within the public switched telephone network and creating a database record for the telephone number in the Hypernumber Database 204. FIG. 10 is a process flow diagram of an aspect method for creating hypernumbers. When a vendor requests to register a hypernumber, block 1100, the telephone number that will become a hypernumber is assigned to the Hypernumber Service Point 130 in the public switched telephone network (PSTN), block 1101. The vendor provides the settings, criteria, information to be requested from callers, information to be sent to callers and call routing instructions are provided to and received by the hypernumber service provider, block 1102. The received information is used to create a customer account and a data record that is saved in the Hypernumber Database 204, block 1104. The hypernumber account may also include business information such as vendor name, address, employment identification number (if a business), social security number (if individual), email address and website address. Upon registration, regular and/or toll-free numbers become loaded and may be treated as hypernumbers.

Since hypernumbers connect callers to hypernumber owners in a manner based on the received caller data and criteria saved in the Hypernumber Database, it is useful to enable the database to be updated with new information. Accordingly, the owners of a hypernumber may update their hypernumber accounts and records stored in the Hypernumber Database as their information changes. Examples of information that may be updated include changes in business locations or hours of operation, opening of new stores, the addition or deletion of telephone numbers for call routing, etc. To accomplish such updates the Hypernumber Service Point or the Hypernumber Database may periodically send update requests to the hypernumber owner, block 1106. Upon receipt of the update request, the hypernumber owners may update their accounts manually or forward updates maintained on vendor servers, block 1108. Alternatively, the hypernumber database server may automatically update the customer account, for example, by periodically connecting to and retrieving updated data from the owner's website. In such an implementation, as the hypernumber owners update their websites, their hypernumber information stored in the Hypernumber Database will automatically update.

Figure 11:
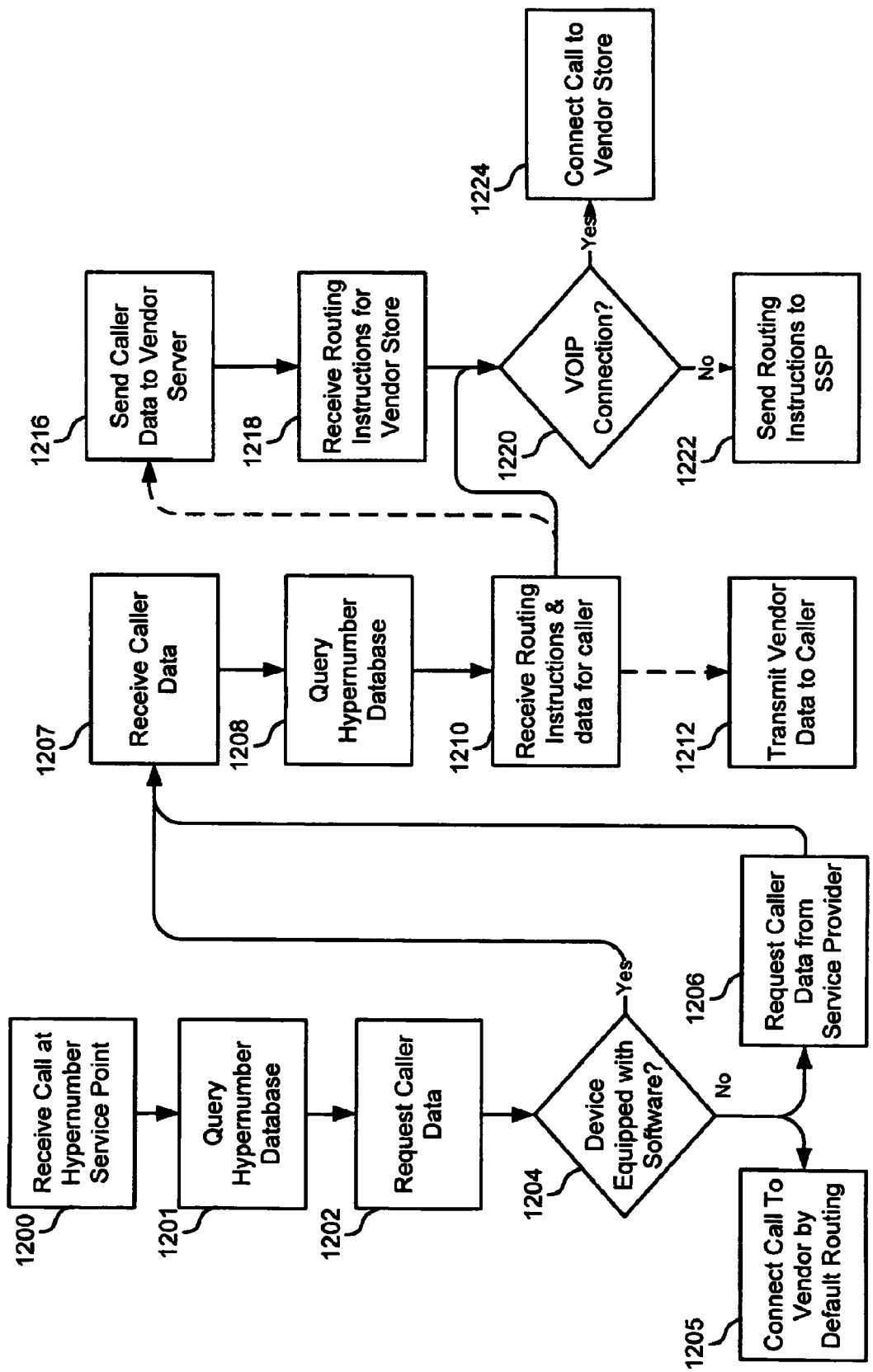
FIG. 11 is a process flow diagram of an aspect method for receiving a hypernumber call.

FIG. 11 is a process flow diagram of an aspect method within a Hypernumber Service Point 130 for receiving and connecting hypernumber phone calls to hypernumber owners (e.g., vendors). When a call is received by the Hypernumber Service Point 130, block 1200, the Hypernumber Service Point 130 may query the Hypernumber Database using the dialed hypernumber as a search key in order to obtain the configuration, settings, responses and routing instructions for that number, block 1201. Using this information, the Hypernumber Service Point 130 may send a hypernumber notification message along with a request for caller data to the communication device 100, block 1202. Depending upon whether a response is received from the communication device 100, the Hypernumber Service Point 130 can determine whether the communication device 100 is equipped with a Hypernumber Software Module, decision block 1204. If the communication device is not equipped with a Hypernumber Software Module (i.e., the Hypernumber Service Point 130 did not receive caller data so decision block 1204="No"), the Hypernumber Service Point 130 may connect the call directly to the vendor based upon default routing instructions received from the Hypernumber Database, block 1205. Alternatively, the Hypernumber Service Point 130 may ascertain the location of a caller by requesting that information from the caller's service provider, block 1206. As discussed above, the service provider may determine the caller's location based upon the base station to which the caller is connected or by employing triangulation. Caller location information received from the caller's service provider, block 1207, may then be used as caller data.

If the communication device 100 is equipped with the Hypernumber Software Module (i.e., decision block 1204="Yes"), the Hypernumber Service Point 130 may receive caller data from the communication device 100, block 1207. The Hypernumber Service Point 130 may query the hypernumber database a second time using received caller data, block 1208. This second query to the hypernumber database can access routing and communication instructions for the hypernumber owner that depend upon or take into account the caller's information. For example, the caller data may provide the caller's location or time of day and this information can be used to provide call routing or information delivery that is most useful to the caller. By querying the hypernumber database using this additional information, caller-specific routing instructions can be provided to the Hypernumber Service Point 130, block 1210. For example, providing routing instructions based upon the caller's information (e.g., local time and geographic location) can enable the hypernumber connection point to connect the call to a vendor location that is open and near to the caller. Also, querying the hypernumber database with the caller data may enable the hypernumber service point 130 to communicate caller-specific information to the caller's communication device 100 (either verbally or via a separate communication link, e.g., e-mail, SMS or Internet), block 1212. For example, the Hypernumber Service Point 130 may communicate the hours of operation or a menu of the day to the caller for the nearby vendor location even as the call is being connected.

The Hypernumber Service Point 130 may also receive in instructions from the Hypernumber Database to forward information to the caller's communication device 100. For example, in response to receiving the caller's location and local time, the Hypernumber Database may identify a data record containing the location and hours of operation of an open establishment close to the caller. This information may then be sent to the communication device 100 as data via the open communication session or as verbal information via the open telephone link to the caller, optional block 1212.

Depending upon the vendor's computer system and as directed by vendor's routing instructions stored in the Hypernumber Database, the Hypernumber Service Point 130 may forward some or all of the caller's data to the vendor's server 206, block 1216. Such information may include the caller's name and telephone number, the caller's geographic location, and any vendor e-coupons that were reported by the caller's communication device in block 1207, for example. Sending such information to the vendor's server 206 may enable the vendor to provide more useful services to the caller when the call is connected. For example, an operator may be able to address the caller by name or look up an account associated with the caller. As another example, the vendor's server may recognize and verify the e-coupons reported by the caller's communication device 100 and report them to an operator. Thus, by automatically communicating selected caller data to the vendor's server 206, vendors can provide more personalized and responsive services to callers without having to ask a series of questions or requiring callers to navigate a series of dial-activated menus.

Using the routing instructions received from the hypernumber database (block 1210) the Hypernumber Service Point 130 may connect the call to a particular telephone, operator or call center operated by the vendor store. To do this, the Hypernumber Service Point 130 may determine from the received routing instructions whether the connection can be made as a VOIP call, decision block 1220. If the vendor will receive a VOIP call (i.e., decision block 1220="Yes"), the Hypernumber Service Point 130 serves as a VOIP router by translating voice sounds from the call into VOIP packets that are routed to the vendor's server 206 (or to a VOIP terminal), block 1224. If the vendor cannot receive a VOIP call (i.e., decision block 1220="No"), the Hypernumber Service Point 130 may send call routing instructions to the SSP 120 so that the call can be connected directly to the vendor, block 1222.

Depending upon the instructions received from the Hypernumber Database, the Hypernumber Service Point 130 may send caller data to the vendor server 206, block 1216. This transmission may be via the Internet or another network. Upon sending caller data to the vendor server 206, the Hypernumber Service Point 130 may receive further routing instructions for connecting the call to a suitable vendor telephone, block 1218. In some cases, such as when the caller data matches routing instruction to more than one vendor telephone, a task option message (verbal or data) may be received from the vendor server 206 for transmission to the caller by the Hypernumber Service Point 130 (optional block not shown). Caller selections may be transmitted to the vendor server 206 which may then send the Hypernumber Service Point 130 specific routing instructions for connecting the call to a vendor telephone, block 1218. The Hypernumber Service Point 130 may then use the routing instructions to connect the call by determining from the received routing instructions whether the connection can be made as a VOIP call, decision block 1220. If the vendor will receive a VOIP call (i.e., decision block 1220="Yes"), the Hypernumber Service Point 130 serves as a VOIP router by translating voice sounds from the call into VOIP packets that are routed to the vendor's server 206 (or to a VOIP terminal), block 1224. If the vendor cannot receive a VOIP call (i.e., decision block 1220="No"), the Hypernumber Service Point 130 may send call routing instructions to the SSP 120 so that the call can be connected directly to the vendor, block 1222.

In an aspect, the vendor server 206 may send to the Hypernumber Service Point 130 instructions to forward an IP address of the vendor server 206 (or another server) to the communication device 100 along with executable instructions (e.g., XML) to cause the communication device 100 to establish an Internet communication session (e.g., a request to access a webpage) with the vendor server 206 or another server. As part of these instructions the vendor server 206 may include a session identifier (ID) to be included in the request for a communication session. By including the session ID in a webpage access request, the communication device 100 can identify the request as corresponding to the hypernumber call and the vendor server 206 response to the Hypernumber Service Point 130. In this manner, the vendor server 206 can respond to the communication session request with data related to the instant hypernumber telephone call.

In an aspect, the Hypernumber Service Point 130 may be configured by software to carry out the functions of a vendor server 206, eliminating the need to connect to the vendor server. In another aspect, the Hypernumber Service Point 130 may be hosted within the vendor server 206. As a vendor server, the Hypernumber Service Point 130 may be connected to the vendor website database to receive updates regarding any changes relating to the business of the vendor. For example, the Hypernumber Service Point 130 may be configured to retrieve website updates as they are inputted in the website. The Hypernumber Service Point 130 may also be configured to receive manual updates by hypernumber owners.

Figure 12:
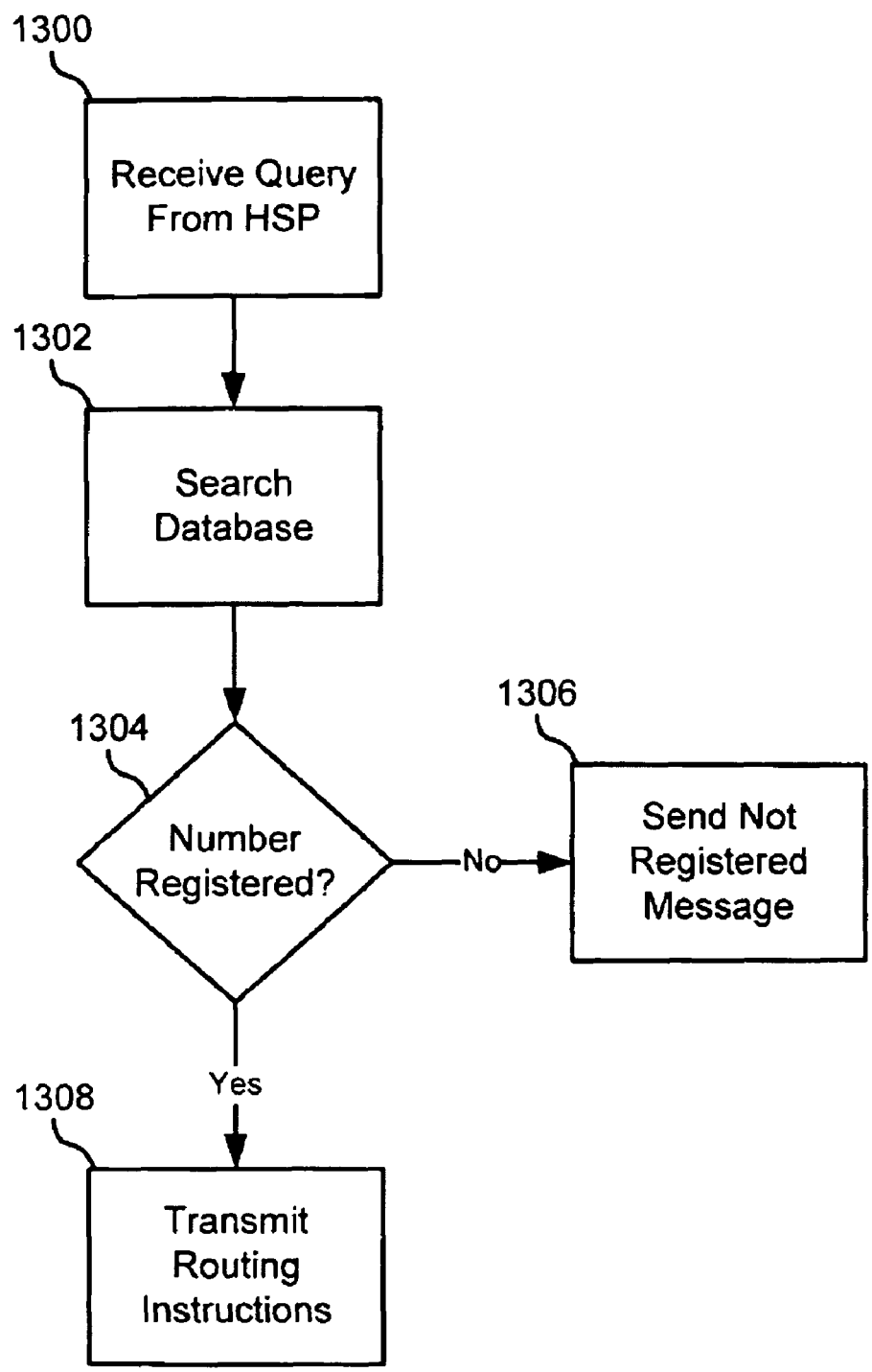
FIG. 12 is a process flow diagram of an aspect method for identifying registered hypernumbers.

FIG. 12 is a process flow diagram of an aspect method for identifying hypernumber routing instructions within a Hypernumber Database 204. When a Hypernumber Database 204 receives a query including a dialed hypernumber (or telephone number of a forwarded call or a brand number) from the Hypernumber Service Point 130, block 1300, the hypernumber may be used as a search key to locate associated records within the database, block 1302. Searching on the dialed number enables the Hypernumber Database 204 to determine whether the dialed number is registered as a hypernumber, decision block 1304. If the dialed number is not found in the database this indicates that the number is not a hypernumber (i.e., decision block 1304="No"), so the Hypernumber Database 204 may send a message to the Hypernumber Service Point 130 that the dialed number is not registered as a hypernumber, block 1306. However, if the dialed number is found in the database (i.e., decision block 1304="Yes"), routing instructions may be transmitted to the Hypernumber Service Point 130 to enable it to handle the call as a hypernumber, block 1308.

FIG. 13 illustrates an example data structure 1400 that may be used in the various aspects to store and access information in the Hypernumber Database 204. As is well known in the computer arts, information may be stored in the form of a table wherein individual data records form the rows of the table and the columns of the table may represent individual data fields within each data record. In the illustrated example data structure 1400, the data fields include the registered hypernumber 1402, the type of data that should requested from a communication device 1404, the vendor data that should be transmitted to the communication device at the initiation of a hypernumber call 1406, and routing instructions 1410, such as the telephone number to which the Hypernumber Service Point 130 should connect the call or an IP address for connecting a VOIP call. Each row 1420-1424 of the data structure 1400 may store the instructions for a single registered hypernumber. Alternatively, multiple data records may be associated with each hypernumber 1402, with the various records selectable based upon received caller data.

For example, row 1420 represents the data records stored for the registered hypernumber 600-123-4567. For this hypernumber, the owner has specified that the request for caller data (block 804 in FIG. 7) should request the caller's name and geographic location (column 1404), that the Hypernumber Service Point 130 should send to the calling communication device a prerecorded greeting that is stored at an identified memory location, and that the call then should be routed to telephone number 345-976-0987. As illustrated in data rows 1422 and 1424, the data structure 1400 provides great flexibility since the different types of caller data may be requested, column 1404, and different data or no data may be specified for transmission to the communication device, column 1406. Similarly, great flexibility in call routing instructions is enabled as the data files can specify individual telephone numbers, IP addresses for VOIP connections, or other more complex routing instructions, column 1408. The data records 1420-1424 and data files 1402-1408 illustrated in FIG. 13 are for illustration purposes only as one of skill in the art will appreciate that any number of data records and data files and a wide variety of data fields may be included in such a data structure.

FIG. 14 illustrates an example data structure 1500 that may be implemented for storing brand number data in the Hypernumber Database 204. As shown in FIG. 14, a brand number may be a series of letters that when pressed on a telephone keypad results in a unique number, column 1502. Such brand numbers may be linked to a hypernumber, column 1402, so that callers can dial brand names (words) to connect to vendors instead of dialing numbers. Data structure 1500 may include the brand numbers 1502 as an independent key for locating the appropriate hypernumber data records. The other data fields 1402-1408 may be similar to those described above with reference to FIG. 13. For example, as shown in row 1522, a coffee shop entitled "World's Best Coffee" may register for the brand number "Kofy" which corresponds to the numbers 8464 on a typical telephone keypad. Upon dialing the word "Kofy," the call may be directed to a Hypernumber Service Point 130 which may then send a query to a Hypernumber Database 204 to determine whether the brand name "Kofy" is registered as a hypernumber. Hypernumber Database 204 may then search the database and determine that "Kofy" is a registered brandnumber 1502. The Hypernumber Database 204 may then provide the Hypernumber Service Point 130 with the caller data request, vendor data transmission and call routing instructions stored in data fields 1402-1408 associated with World's Best Coffee.

Figure 15:
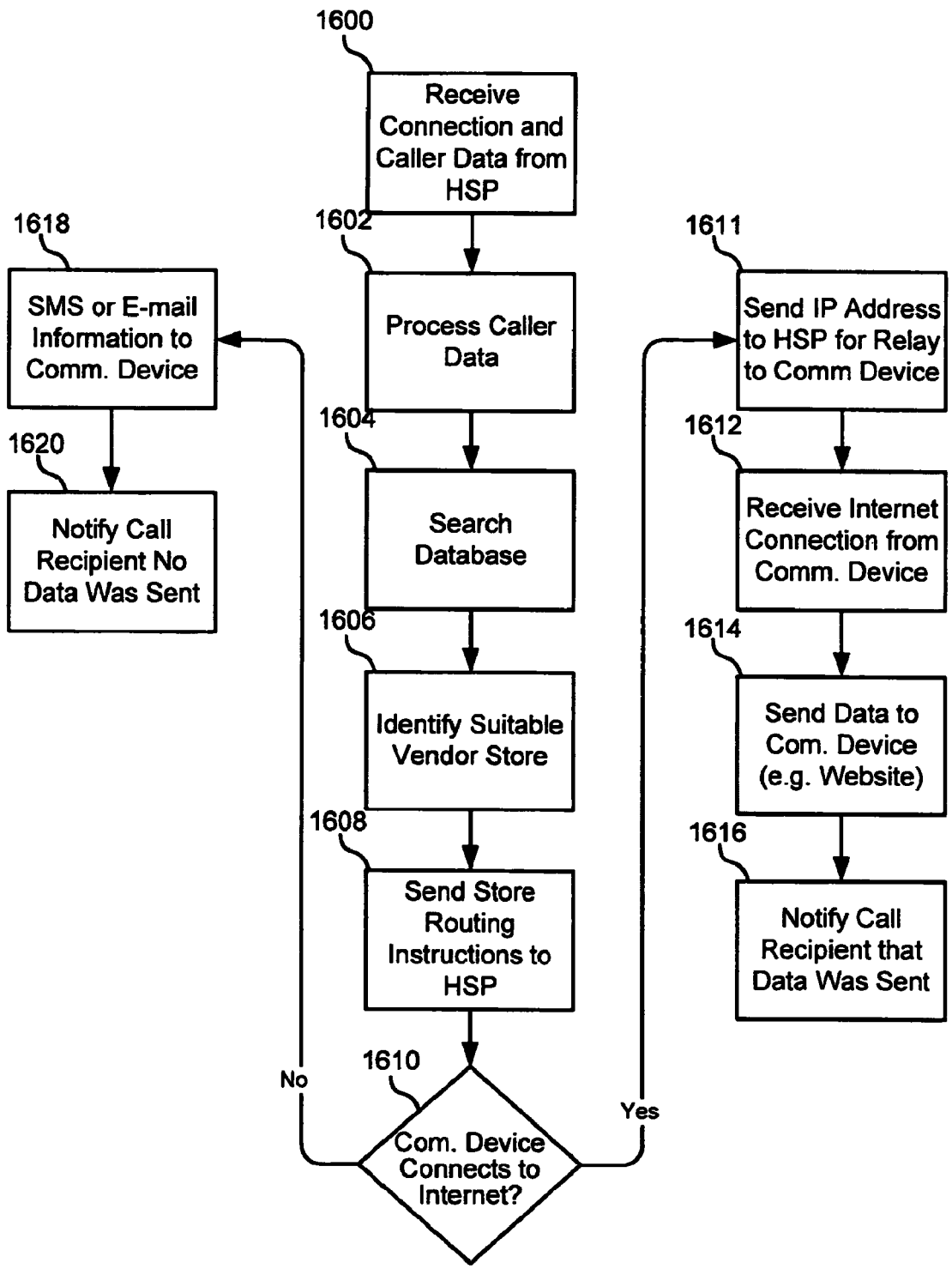
FIG. 15 is a process flow diagram of aspect steps for connecting hypernumbers using vendor servers.

FIG. 15 is a process flow diagram of an aspect method for supporting hypernumber services within a vendor server 206. The vendor server may receive a communication session and caller information from the Hypernumber Service Point 130, block 1600. The vendor server 206 may process the received caller data, block 1602, such as by parsing and recognizing selected data useful for a search its database, block 1604. A search of a routing instructions database using the received caller data may enable the vendor server 206 to identify routing instructions suitable for connecting the call to a particular vendor store, for example, block 1606. The vendor server 206 may then send those routing instructions to the Hypernumber Service Point 130 for use in connecting the call, block 1608. The vendor server 206 may also determine from the received caller data whether the communication device 100 is capable of accessing the Internet, decision block 1610. If the communication device 100 is capable of connecting to the Internet (i.e., block 1610="Yes"), the vendor server 206 may also send the server's IP address to the Hypernumber Service Point 130 for relay to the communication device 100, block 1611. The vendor server 206 may then await a webpage access request from the communication device 100 via the Internet, block 1612. By replying to the webpage access request the vendor server 206 can establish a communication session with the communication device 100, and through that session send additional data, such as website address or task options menu, to the communication device 100, block 1614. The vendor server 206 may also notify a recipient of the incoming call (e.g., an operator at a call center who will receive the call when it is routed by the Hypernumber Service Point 130) of the data that was transmitted to the communication device so the operator is informed of the caller's access to information, block 1616. If, however, the communication device 100 is incapable of connecting to the Internet (i.e., decision block 1610="No"), the vendor server 206 send information to the communication device 100 via an addressed message, such as an SMS or e-mail message, block 1618. An SMS message may be sent using the caller's cellular telephone number, while an e-mail message may be sent using the caller's e-mail address, both of which may be included in the caller data received by the vendor server in block 1600. The vendor server 206 may also notify a recipient of the incoming call (e.g., an operator at a call center who will receive the call when it is routed by the Hypernumber Service Point 130) that no data was transmitted to the communication device so the operator is informed of the caller's limited access to information, block 1620.

Vendor-specific information communicated to communication devices 100 calling a hypernumber may include a wide range of items, such as electronic or verbal driving directions, electronic coupons, menus, promotions or product advertisements. Further, the information sent to the communication device may be dependent on or responsive to the caller-specific information received via the hypernumber processes. For example, if a caller dials a hypernumber to an Irish pub on a warm day, the establishment's vendor server 206 may receive information about the caller including, for example, the ambient temperature if the communication device 100 is equipped with a temperature sensor. Upon receipt of the caller's information, the vendor server 206 may transmit an electronic coupon for a cold beer to the caller's communication device 100, such as by means of an e-mail or SMS message, along with driving directions to the nearest establishment.

Figure 16:
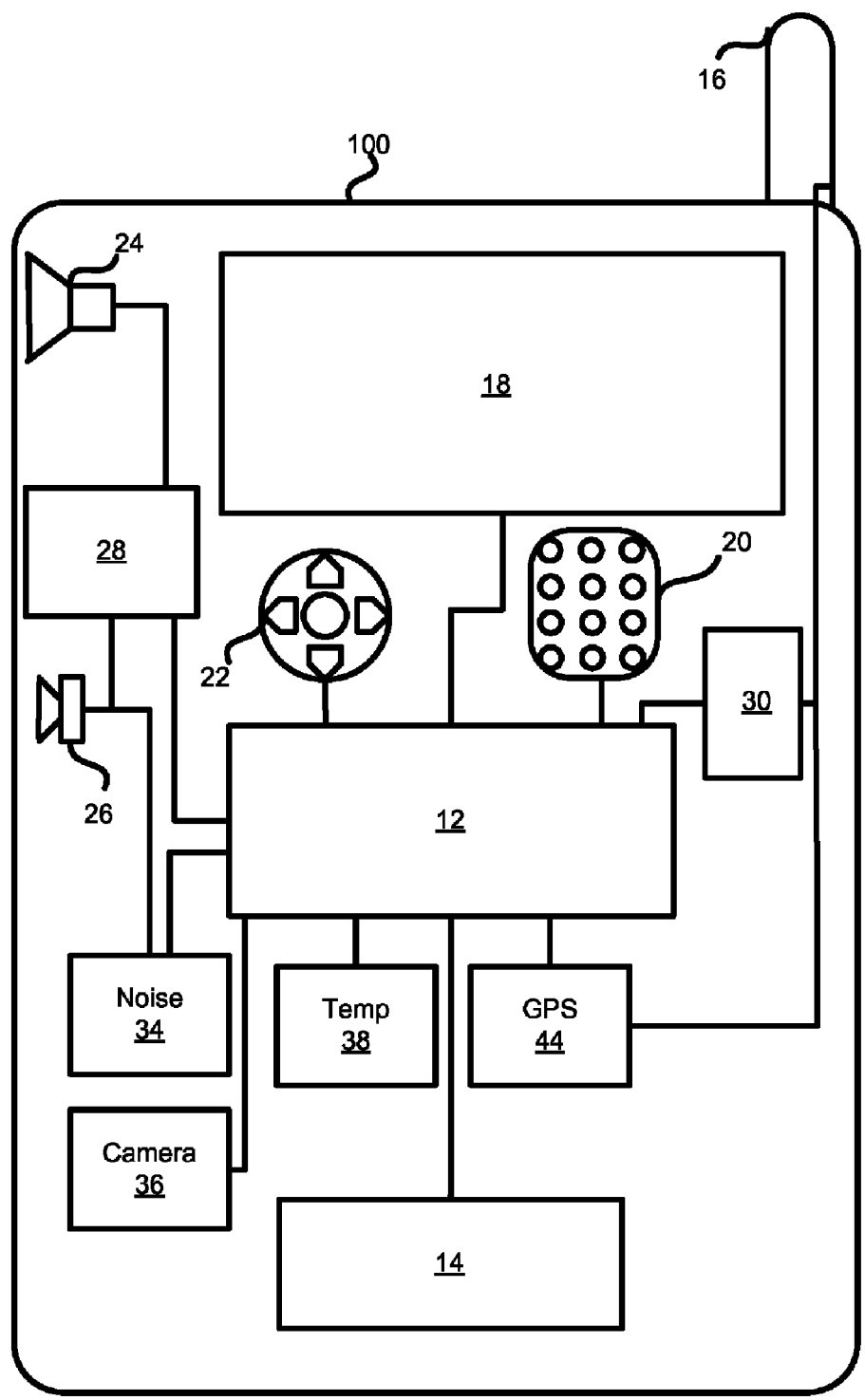
FIG. 16 is a component block diagram of a mobile device suitable for use with the various aspects.

FIG. 16 is a system block diagram of a communication device 100 for use in the various aspects. As shown in FIG. 16, a communication device 100 may include a microprocessor 12, a memory 14, an antenna 16, a display 18, an alphanumeric keypad 20, a 4-way menu selector key or rocker switch 22, a speaker 24, a microphone 26, a vocoder 28, a wireless network transceiver 30, and various interconnections. In addition, the communication device 100 may contain an ambient noise sensor 34 which may include a microphone or may be connected to the communication device's microphone 26 to detect ambient noise. The communication device 100 may also include a camera 36 and a GPS receiver circuit 44 which is capable of detecting the global position of the communication device 100. The communication device 100 may also include other sensors suitable for recording information relevant to a communication device's location and use, such as an ambient temperature sensor 38.

The processor 12 may be any programmable microprocessor, microcomputer or multiple processor chip or chips that can be configured by software instructions (applications) to perform a variety of functions, including the functions of the various aspects described above. In some mobile devices, multiple processors 12 may be provided, such as one processor dedicated to wireless communication functions and one processor dedicated to running other applications. Typically, software applications may be stored in the internal memory 14 before they are accessed and loaded into the processor 12. In some mobile devices, the processor 12 may include internal memory sufficient to store the application software instructions. For the purposes of this description, the term memory refers to all memory accessible by the processor 12, including internal memory 14 and memory within the processor 12 itself. The memory 14 may be volatile or nonvolatile memory, such as flash memory, or a mixture of both.

The various aspects may be implemented by the communication device processor 12 executing instructions of a Hypernumber Software Module which are configured to implement one or more of the described methods. Such software instructions may be stored in memory 14 as the device's operating system software, a series of APIs implemented by the operating system, within firmware, or as compiled software implementing an aspect method. Further, the Hypernumber Software Module may be stored on any form of tangible processor-readable memory, including: a random access memory 14, a memory module plugged into the communication device 100, such as an SD memory chip, an external memory chip such as a USB-connectable external memory (e.g., a "flash drive"), read only memory (such as an EEPROM); hard disc memory, a floppy disc, and/or a compact disc.

Figure 17:
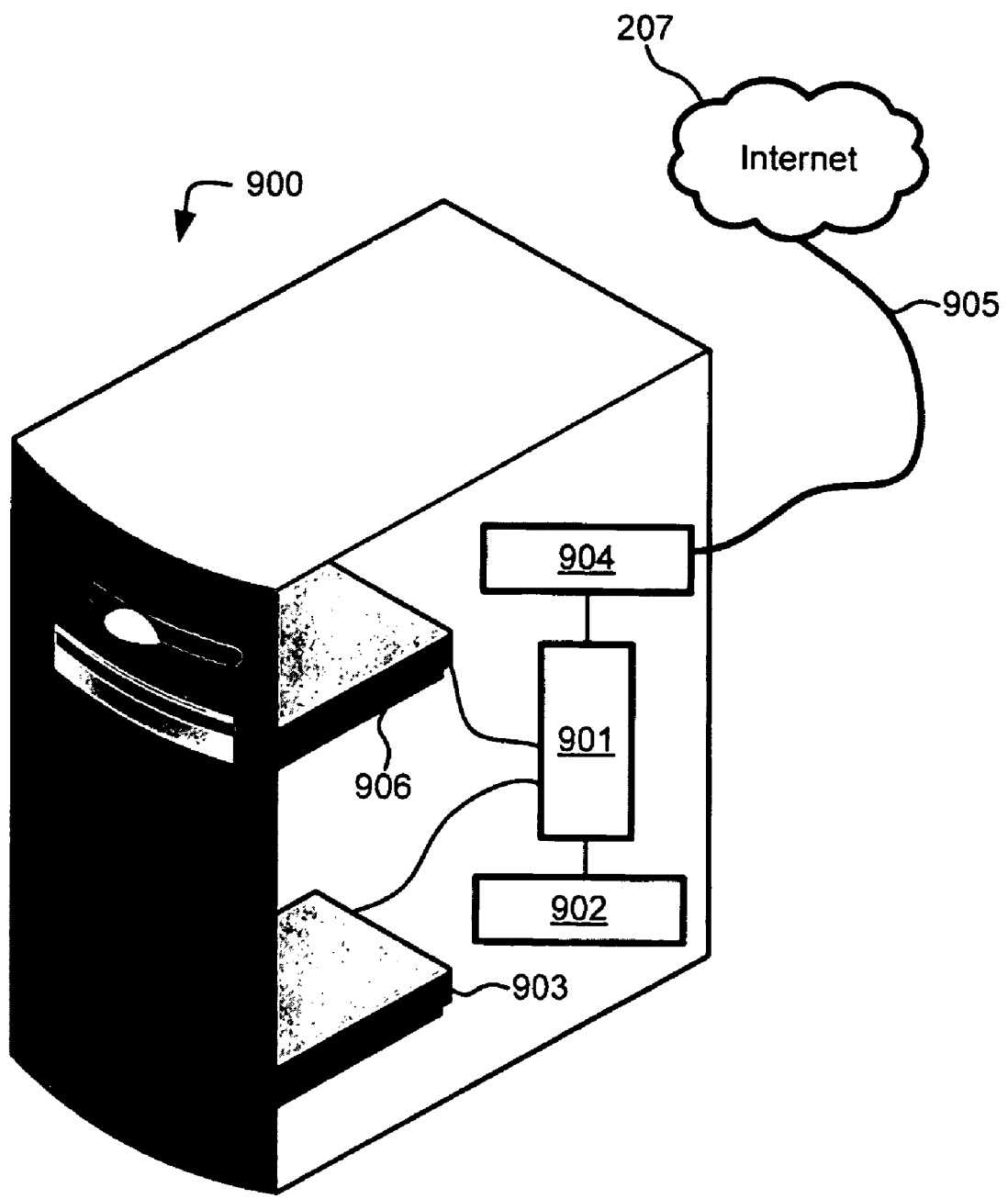
FIG. 17 is a component block diagram of a server suitable for use with the various aspects.

The aspects described above involving servers may be implemented on any of a variety of commercially available server systems such as illustrated in FIG. 17. Such a server 900 typically includes a processor 901 coupled to volatile memory 902 and a large capacity nonvolatile memory, such as a disk drive 903. The processor 901 is typically coupled to one or more network interface circuits, such as high speed modems 904 coupled to a network 905 such as the Internet 207. The server 900 may also include a portable media reader, such as a compact disc (CD) drive 906 coupled to the processor 901.

The processor 901 may be configured with database software and the disk drive 903 may be populated with hypernumber services data records so that the server 900 includes the Hypernumber Database 204 as an internally addressable component part. Alternatively, the Hypernumber Database 204 may be hosted on another computer coupled to the server 900 via a network connection 905, such as a data cable (not shown), a local area network (not shown), or the Internet 207.

The foregoing aspects provide a hypernumber system that expands the currently static telephone system to enable dynamically personalized connections between the calling and receiving parties. For example, a caller may use a hypernumber to call Pizza Hut®. Dialing a hypernumber may allow the caller to be automatically connect to a nearby Pizza Hut® location based on caller data received from the caller's communication device and instructions provided by Pizza Hut® and stored in the Hypernumber Database 204. Data received from a caller may include the caller's geographic location while data provided Pizza Hut® and stored in the Hypernumber Database 204 may include locations and/or business hours. Thus, hypernumbers may enable callers to expeditiously and automatically receive vendor information by simply dialing the vendor's hypernumber. Similarly, hypernumbers may allow the vendors to provide their potential customers with up-to-date information, such as business hours, and direct their customers to vendors nearest to the vendor locations.

The hypernumber methods and systems of the various aspects may reduce the cost of communication by, for example, reducing the time that a caller spends looking-up a business's telephone number or receiving directions to a business's location. These methods and systems also may reduce the business's overhead by eliminating the need for directing customers to customer service representatives since customers are able to have their calls automatically routed to suitable business locations.

Several business models may be enabled by providing hypernumbers to customers. In one business model a hypernumber service provider may sell the hypernumber related systems and software to mobile operators and allow consumers, such as businesses, to purchase hypernumbers from mobile operators. Mobile operators may provide this service to users free of charge or as a fee-bearing service. If mobile operators offer the service to users for free, the revenue for this service may be generated from hypernumber owning businesses which might pay a per call premium for received hypernumber calls. Alternatively, mobile operators may charge users, both callers and receiving parties, a nominal subscription fee for access to the hypernumber services.

In another business model, the hypernumber service provider may retain ownership of the hypernumber service and work with mobile operators to provider their users with this hypernumber services for a fee. In this model the revenue for the service provider may be generated from the services provided to the mobile operators.

In another business model, individual businesses may provide the hypernumber services by hosting and controlling the Hypernumber Service Point 130. For example, a large business's toll free calls may be routed to the business's Hypernumber Service Point 130 so that initial call processing can be accomplished using the hypernumber functionality described herein, such as obtaining caller data and sending data to the calling communication device 100 before connecting the call to an appropriate operator.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order.

The hardware used to implement the foregoing aspects may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method blocks corresponding to the above methods. Alternatively, some blocks or methods may be performed by circuitry that is specific to a given function.

It is well known in the art that the various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The blocks of a method or algorithm described in connection with the aspects disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein, and instead the claims should be accorded the widest scope consistent with the principles and novel features disclosed herein.

What is claimed is:

1. A method for communicating using a communication device, comprising:
   placing a call to a number dialed into the communication device;
   transmitting caller data to a hypernumber service point;
   receiving a series of task options generated based on the transmitted caller data, wherein the series of task options comprises at least two possible call destinations;
   transmitting a task option selection to the hypernumber service point;
   receiving a notification from the hypernumber service point that the call was placed to a hypernumber, and
   automatically recognizing that the dialed number is a hypernumber, wherein transmitting the caller data is accomplished in response to recognizing that the dialed number is a hypernumber.

2. The method of claim 1, further comprising receiving a request for caller information from the hypernumber service point, wherein transmitting caller data further comprises transmitting at least a portion of the requested caller information.

3. The method of claim 1, further comprising receiving information from the hypernumber service point.

4. The method of claim 1, further comprising:
   receiving a notification from the hypernumber service point that the call was placed to a hypernumber; and
   establishing a communication session with the hypernumber service point,
   wherein caller data and the task option selection are transmitted to the hypernumber service point via the communication session.

5. The method of claim 1, wherein the caller data includes at least one of location data, personal information about an owner of the communication device, electronic coupons and promotions stored in memory of the communication device and a specification of the communication device.

6. A method for communicating, comprising:
   receiving a telephone call from a communication device placed to a hypernumber;
   receiving caller data from the communication device;
   determining a series of task options based on the received caller data, wherein the series of task options comprises at least two possible call destinations;
   transmitting the series of task options to the communication device;
   receiving a task option selection from the communication device;
   forwarding the telephone call based on the received task option selection;
   receiving a notification from the hypernumber service point that the call was placed to a hypernumber, and
   automatically recognizing that the dialed number is a hypernumber, wherein receiving the caller data is accomplished in response to recognizing that the dialed number is a hypernumber.

7. The method of claim 6, further comprising:
   sending a query to a hypernumber database including the hypernumber; and
   receiving routing instructions from the hypernumber database corresponding to the hypernumber,
   wherein forwarding the telephone call comprises forwarding the telephone call in accordance with the received routing instructions.

8. The method of claim 6, further comprising forwarding the received caller data to a second server.

9. The method of claim 8, further comprising receiving routing instructions from the second server, wherein forwarding the telephone call comprises forwarding the telephone call in accordance with the received routing instructions.

10. The method of claim 6, further comprising forwarding an Internet address for a second server to the communication device in a message configured to enable the communication device to establish an Internet communication session with the second server.

11. The method of claim 6, further comprising:
    requesting caller location information from a cellular telephone service provider with which the communication device is communicating; and
    receiving caller location information from the cellular telephone service provider.

12. The method of claim 6, wherein the received caller data includes at least one of location data, personal information about an owner of the communication device, electronic coupons and promotions stored in the communication device and a specification of the communication device.

13. The method of claim 6, wherein forwarding the telephone call comprises transmitting the telephone call to a second server as a voice over Internet protocol (VOIP) call.

14. A method, comprising:
    receiving caller data from a hypernumber service point;
    determining a series of task options based on the received caller data, wherein the series of task options comprises at least two possible call destinations;
    transmitting the series of task options to the hypernumber service point for forwarding to a communication device;
    receiving a task option selection, by the communication device, from the hypernumber service point;
    providing call routing instructions to the hypernumber service point based on the received task option selection;
    receiving a notification from the hypernumber service point that the call was placed to a hypernumber; and
    automatically recognizing that the dialed number is a hypernumber, wherein transmitting the caller data is accomplished in response to recognizing that the dialed number is a hypernumber.

15. The method of claim 14, further comprising receiving a voice over Internet protocol (VOIP) call from the hypernumber service point.

16. The method of claim 14, further comprising:
    sending to the hypernumber service point an Internet protocol (IP) address for forwarding to the communication device;
    receiving a request for an Internet communication session from the communication device directed to the IP address; and
    sending data to the communication device via the Internet communication session.

17. The method of claim 14, further comprising displaying received caller data to an operator to which the call routing instructions will direct a call from the communication device.

18. A communication device, comprising:
a processor; and
a memory coupled to the processor,
wherein the processor is configured with processor-executable instructions to perform operations comprising:
placing a call to a number dialed into the communication device;
transmitting caller data to a hypernumber service point;
receiving from the hypernumber service point a series of task options comprising at least two possible call destinations based on the caller data;
transmitting a task option selection to the hypernumber service point for completing the call to the call destination based on the task option selection;
receiving a notification from the hypernumber service point that the call was placed to a hypernumber, and
automatically recognizing that the dialed number is a hypernumber, wherein transmitting the caller data is accomplished in response to recognizing that the dialed number is a hypernumber.

19. The communication device of claim 18, wherein the processor is configured with processor executable instructions to perform operations further comprising receiving a request for caller information from the hypernumber service point, wherein transmitting the caller data further comprises transmitting at least a portion of the requested caller information.

20. The communication device of claim 18, wherein the processor is configured with processor executable instructions to perform operations further comprising receiving information from the hypernumber service point.

21. The communication device of claim 18, wherein the processor is configured with processor executable instructions to perform operations further comprising:
receiving a notification from the hypernumber service point that the call was placed to a hypernumber; and
establishing a communication session with the hypernumber service point,
wherein the caller data and the task option selection are transmitted to the hypernumber service point via the communication session.

22. The communication device of claim 18, further comprising a Global Positioning Satellite system receiver coupled to the processor, wherein the processor is configured with processor executable instructions to perform operations such that the caller data includes at least one of location data, personal information about an owner of the communication device, electronic coupons and promotions stored in the memory of the communication device and a specification of the communication device.

23. A computer system, comprising:
a memory;
a processor coupled to the memory; and
a network connection coupled to the processor,
wherein the processor is configured with software instructions to perform operations comprising:
receiving a telephone call from a communication device placed to a hypernumber;
receiving caller data from the communication device;
determining a series of task options based on the received caller data, wherein the series of task options comprises at least two possible call destinations;
transmitting the series of task options to the communication device;
receiving a task option selection from the communication device;
forwarding the telephone call based on the received task option selection
receiving a notification from a hypernumber service point that the call was placed to a hypernumber, and
automatically recognizing that the dialed number is a hypernumber, wherein receiving the caller data is accomplished in response to recognizing that the dialed number is a hypernumber.

24. The computer system of claim 23, wherein the processor is configured with software instructions to further perform operations comprising:
sending a query to a hypernumber database including the hypernumber; and
receiving routing instructions from the hypernumber database corresponding to the hypernumber,
wherein forwarding the telephone call comprises forwarding the telephone call in accordance with the received routing instructions.

25. The computer system of claim 23, wherein the processor is configured with software instructions to further perform operations comprising forwarding the received caller data to a second server.

26. The computer system of claim 25, wherein the processor is configured with software instructions to further perform operations comprising receiving routing instructions from the second server, wherein forwarding the telephone call comprises forwarding the telephone call in accordance with the received routing instructions.

27. The computer system of claim 23, wherein the processor is configured with software instructions to further perform operations comprising forwarding an Internet address for a second server to the communication device in a message configured to enable the communication device to establish an Internet communication session with the second server.

28. The computer system of claim 23, wherein the processor is configured with software instructions to further perform operations comprising:
requesting caller location information from a cellular telephone service provider with which the communication device is communicating; and
receiving caller location information from the cellular telephone service provider.

29. The computer system of claim 23, wherein the processor is configured with software instructions to further perform operations such that forwarding the telephone call comprises transmitting the telephone call to a second server as a voice over Internet protocol (VOIP) call.

30. A server, comprising:
a server memory;
a server processor coupled to the server memory; and
a network connection coupled to the server processor,
wherein the server processor is configured with software instructions to perform operations comprising:
receiving caller data from a hypernumber service point;
determining a series of task options based on the received caller data, wherein the series of task options comprises at least two possible call destinations;
transmitting the series of task options to the hypernumber service point for forwarding to a communication device;
receiving a task option selection, by the communication device, from the hypernumber service point;
providing call routing instructions to the hypernumber service point based on the received task option selection receiving a notification from the hypernumber service point that the call was placed to a hypernumber, and automatically recognizing that the dialed number is a hypernumber, wherein transmitting the caller data is accomplished in response to recognizing that the dialed number is a hypernumber.

31. The server of claim 30, wherein the server processor is configured with software instructions to further perform operations comprising receiving a voice over Internet protocol (VOIP) call from the hypernumber service point.

32. The server of claim 30, wherein the server processor is configured with software instructions to further perform operations comprising:

sending to the hypernumber service point an Internet protocol (IP) address for forwarding to a communication device;

receiving a request for an Internet communication session from the communication device directed to the IP address; and sending data to the communication device via the Internet communication session.

33. The server of claim 30, wherein the server processor is configured with software instructions to further perform operations comprising displaying received caller data to an operator to which the call routing instructions will direct a call from a communication device.

34. A communication device, comprising:

means for placing a call to a number dialed into the communication device;

means for transmitting caller data to a hypernumber service point;

means for receiving from the hypernumber service point a series of task options comprising at least two possible call destinations based on the caller data;

means for transmitting a task option selection to the hypernumber service point for forwarding the call based on the task option selection means for receiving a notification from the hypernumber service point that the call was placed to a hypernumber, and means for automatically recognizing that the dialed number is a hypernumber, wherein transmitting the caller data is accomplished in response to recognizing that the dialed number is a hypernumber.

35. The communication device of claim 34, further comprising means for receiving a request for caller information from the hypernumber service point, wherein means for transmitting caller data to a hypernumber service point comprises means for transmitting at least a portion of the requested caller information.

36. The communication device of claim 34, further comprising means for receiving information from the hypernumber service point.

37. The communication device of claim 34, further comprising:

means for receiving a notification from the hypernumber service point that the call was placed to a hypernumber; and means for establishing a communication session with the hypernumber service point, wherein means for transmitting caller data to the hypernumber service point comprises means for transmitting the caller data via the communication session.

38. The communication device of claim 34, wherein means for transmitting caller data comprises means for transmitting at least one of location data, personal information about an owner of the communication device, electronic coupons and promotions stored in memory of the communication device and a specification of the communication device.

39. A computer system, comprising:

means for receiving a telephone call from a communication device placed to a hypernumber;

means for receiving caller data from the communication device;

means for determining a series of task options based on the received caller data, wherein the series of task options comprises at least two possible call destinations;

means for transmitting the series of task options to the communication device;

means for receiving a task option selection from the communication device;

means for forwarding the telephone call based on the received task option selection means for receiving a notification from the hypernumber service point that the call was placed to a hypernumber, and means for automatically recognizing that the dialed number is a hypernumber, wherein transmitting the caller data is accomplished in response to recognizing that the dialed number is a hypernumber.

40. The computer system of claim 39, further comprising:

means for querying a hypernumber database including the hypernumber; and means for receiving routing instructions from the hypernumber database corresponding to the hypernumber, wherein means for forwarding the telephone call comprises means for forwarding the telephone call in accordance with the received routing instructions.

41. The computer system of claim 39, further comprising means for forwarding the received caller data to a second server.

42. The computer system of claim 41, further comprising means for receiving routing instructions from the second server, wherein means for forwarding the telephone call comprises means for forwarding the telephone call in accordance with the received routing instructions.

43. The computer system of claim 39, further comprising means for forwarding an Internet address for a second server to the communication device in a message configured to enable the communication device to establish an Internet communication session with the second server.

44. The computer system of claim 39, further comprising:

means for requesting caller location information from a cellular telephone service provider with which the communication device is communicating; and means for receiving caller location information from the cellular telephone service provider.

45. The computer system of claim 39, wherein the means for forwarding the telephone call comprises means for transmitting the telephone call to a second server as a voice over Internet protocol (VOIP) call.

46. A server, comprising:

means for receiving caller data from a hypernumber service point;

means for determining a series of task options based on the received caller data, wherein the series of task options comprises at least two possible call destinations;

means for transmitting the series of task options to the hypernumber service point for forwarding to a communication device;

means for receiving a task option selection, by the communication device, from the hypernumber service point;

means for providing call routing instructions to the hypernumber service point based on the received task option selection means for receiving a notification from the hypernumber service point that the call was placed to a hypernumber, and means for automatically recognizing that the dialed number is a hypernumber, wherein transmitting the caller data is accomplished in response to recognizing that the dialed number is a hypernumber.

47. The server of claim 46, further comprising means for receiving a voice over Internet protocol (VOIP) call from the hypernumber service point.

48. The server of claim 46, further comprising:
means for sending to the hypernumber service point an Internet protocol (IP) address for forwarding to a communication device;
means for receiving a request for an Internet communication session from the communication device directed to the IP address; and
means for sending data to the communication device via the Internet communication session.

49. The server of claim 46, further comprising means for displaying received caller data to an operator to which the call routing instructions will direct a call from a communication device.

50. A non-transitory computer-readable medium having stored thereon processor-executable instructions configured to cause a processor to perform operations, comprising:
placing a call to a number dialed into a communication device;
transmitting caller data to a hypernumber service point;
receiving from the hypernumber service point a series of task options comprising at least two possible call destinations based on the caller data;
transmitting a task option selection to the hypernumber service point receiving a notification from the hypernumber service point that the call was placed to a hypernumber, and
automatically recognizing that the dialed number is a hypernumber, wherein transmitting the caller data is accomplished in response to recognizing that the dialed number is a hypernumber.

51. The non-transitory computer-readable medium of claim 50, wherein the stored processor-executable instruction are configured to cause the processor to perform operations further comprising:
receiving a request for caller information from the hypernumber service point,
wherein transmitting caller data to a hypernumber service point further comprises transmitting at least a portion of the requested caller information to the hypernumber service point.

52. The non-transitory computer-readable medium of claim 50, wherein the stored processor-executable instruction are configured to cause the processor to perform operations further comprising:
receiving information from the hypernumber service point.

53. The non-transitory computer-readable medium of claim 50, wherein the stored processor-executable instruction are configured to cause the processor to perform operations further comprising:
receiving a notification from the hypernumber service point that the call was placed to a hypernumber; and
establishing a communication session with the hypernumber service point,
wherein the caller data and the task option selection are transmitted to the hypernumber service point via the communication session.

54. The non-transitory computer-readable medium of claim 50, wherein the caller data includes one of at least location data, personal information about an owner of the communication device, electronic coupons and promotions stored in a memory of the communication device and a specification of the communication device.

55. A non-transitory computer-readable medium having stored thereon processor-executable instructions configured to cause a processor to perform operations, comprising:
receiving a telephone call from a communication device placed to a hypernumber;
receiving caller data from the communication device;
determining a series of task options based on the received caller data, wherein the series of task options comprises at least two possible call destinations;
transmitting the series of task options to the communication device;
receiving a task option selection from the communication device;
forwarding the telephone call based on the received task option selection
receiving a notification from a hypernumber service point that the call was placed to a hypernumber, and
automatically recognizing that the dialed number is a hypernumber, wherein transmitting the caller data is accomplished in response to recognizing that the dialed number is a hypernumber.

56. The non-transitory computer-readable medium of claim 55, wherein the stored processor-executable instruction are configured to cause the processor to perform operations further comprising:
sending a query to a hypernumber database including the hypernumber; and
receiving routing instructions from the hypernumber database corresponding to the hypernumber,
wherein forwarding the telephone call comprises forwarding the telephone call in accordance with the received routing instructions.

57. The non-transitory computer-readable medium of claim 55, wherein the stored processor-executable instruction are configured to cause the processor to perform operations further comprising:
forwarding the received caller data to a second server.

58. The non-transitory computer-readable medium of claim 57, wherein the stored processor-executable instruction are configured to cause the processor to perform operations further comprising:
receiving routing instructions from the second server,
wherein forwarding the telephone call comprises forwarding the telephone call in accordance with the received routing instructions.

59. The non-transitory computer-readable medium of claim 55, wherein the stored processor-executable instruction are configured to cause the processor to perform operations further comprising:
forwarding an Internet address for a second server to the communication device in a message configured to enable the communication device to establish an Internet communication session with the second server.

60. The non-transitory computer-readable medium of claim 55, wherein the stored processor-executable instruction are configured to cause the processor to perform operations further comprising:
requesting caller location information from a cellular telephone service provider with which the communication device is communicating; and receiving caller location information from the cellular telephone service provider.

61. The non-transitory computer-readable medium of claim 55, wherein forwarding the telephone call comprises transmitting the telephone call to a second server as a voice over Internet protocol (VOIP) call.

62. A non-transitory computer-readable medium having stored thereon processor-executable instructions configured to cause a processor to perform operations, comprising:
   receiving caller data from a hypernumber service point;
   determining a series of task options based on the received caller data, wherein the series of task options comprises at least two possible call destinations;
   transmitting the series of task options to the hypernumber service point for forwarding to a communication device;
   receiving a task option selection, by the communication device, from the hypernumber service point;
   providing call routing instructions to the hypernumber service point based on the received task option selection
   receiving a notification from the hypernumber service point that the call was placed to a hypernumber, and
   automatically recognizing that the dialed number is a hypernumber, wherein transmitting the caller data is accomplished in response to recognizing that the dialed number is a hypernumber.

63. The non-transitory computer-readable medium of claim 62, wherein the stored processor-executable instruction are configured to cause the processor to perform operations further comprising:
   receiving a voice over Internet protocol (VOIP) call from the hypernumber service point.

64. The non-transitory computer-readable medium of claim 62, wherein the stored processor-executable instruction are configured to cause the processor to perform operations further comprising:
   sending to the hypernumber service point an Internet protocol (IP) address for forwarding to a communication device;
   receiving a request for an Internet communication session from the communication device directed to the IP address; and
   sending data to the communication device via the Internet communication session.

65. The non-transitory computer-readable medium of claim 62, wherein the stored processor-executable instruction are configured to cause the processor to perform operations further comprising:
   displaying received caller data to an operator to which the call routing instructions will direct a call from a communication device.

* * * * *